United States Patent
Drees

(10) Patent No.: US 11,429,077 B2
(45) Date of Patent: Aug. 30, 2022

(54) BUILDING CONTROL SYSTEM WITH ADAPTIVE USER INTERFACE

(71) Applicant: Johnson Controls Technology Company, Auburn Hills, MI (US)

(72) Inventor: Kirk H. Drees, Cedarburg, WI (US)

(73) Assignee: Johnson Controls Tyco IP Holdings LLP, Milwaukee, WI (US)

(*) Notice: Subject to any disclaimer, the term of this patent is extended or adjusted under 35 U.S.C. 154(b) by 183 days.

(21) Appl. No.: 16/719,506

(22) Filed: Dec. 18, 2019

(65) Prior Publication Data
US 2020/0125059 A1 Apr. 23, 2020

Related U.S. Application Data

(63) Continuation of application No. 15/232,800, filed on Aug. 9, 2016, now Pat. No. 10,528,020.

(51) Int. Cl.
*G05B 13/02* (2006.01)
*G05B 19/409* (2006.01)
(Continued)

(52) U.S. Cl.
CPC .......... *G05B 19/0428* (2013.01); *G05B 11/01* (2013.01); *G05B 13/021* (2013.01);
(Continued)

(58) Field of Classification Search
None
See application file for complete search history.

(56) References Cited

U.S. PATENT DOCUMENTS

| | | | |
|---|---|---|---|
| 6,219,590 B1 | 4/2001 | Bernaden, III et al. | |
| 6,408,228 B1 * | 6/2002 | Seem | F24F 11/30 |
| | | | 700/276 |
| 7,827,813 B2 | 11/2010 | Seem | |
| 8,027,742 B2 | 9/2011 | Seem et al. | |

(Continued)

FOREIGN PATENT DOCUMENTS

| | | |
|---|---|---|
| JP | S61-173692 A | 8/1986 |
| JP | H1124736 A | 1/1999 |
| JP | H11-193953 A | 7/1999 |

OTHER PUBLICATIONS

Office Action on Japanese Application No. 2017-150414 dated Oct. 2, 2018. 4 pages.

*Primary Examiner* — Kenneth M Lo
*Assistant Examiner* — Istiaque Ahmed
(74) *Attorney, Agent, or Firm* — Foley & Lardner LLP

(57) ABSTRACT

A building control system has a controller including a processing circuit configured to transition between multiple discrete operating states by executing state transitions, generate an adaptive user interface including a representation of the multiple discrete operating states and the state transitions therebetween, and automatically learn one or more learned behaviors or preferences of the user. The processing circuit is also configured to retrieve, from a descriptive text database, a description of a selected operating state or selected state transition based on the one or more learned behaviors or preferences of the user, the descriptive text database storing multiple different descriptions of the selected operating state or selected state transition, and update the adaptive user interface to provide the description of the selected operating state or selected state transition retrieved from the descriptive text database based on the one or more learned behaviors or preferences of the user.

20 Claims, 13 Drawing Sheets

(51) Int. Cl.
  G05B 19/042 (2006.01)
  G06F 3/048 (2013.01)
  G05B 15/02 (2006.01)
  G05B 11/01 (2006.01)
  G06F 3/0482 (2013.01)
  G06F 9/451 (2018.01)
  G06N 20/00 (2019.01)

(52) U.S. Cl.
  CPC ......... G05B 13/0265 (2013.01); G05B 15/02 (2013.01); G05B 19/409 (2013.01); G06F 3/048 (2013.01); G06F 3/0482 (2013.01); G05B 2219/25011 (2013.01); G05B 2219/2614 (2013.01); G05B 2219/2642 (2013.01); G06F 9/451 (2018.02); G06N 20/00 (2019.01)

(56) References Cited

U.S. PATENT DOCUMENTS

| | | |
|---|---|---|
| 8,096,140 B2 | 1/2012 | Seem |
| 8,200,344 B2 | 6/2012 | Li et al. |
| 8,200,345 B2 | 6/2012 | Li et al. |
| 8,495,888 B2 | 7/2013 | Seem |
| 2009/0077055 A1* | 3/2009 | Dillon .................. G06F 16/337 |
| 2009/0140057 A1 | 6/2009 | Leen |
| 2014/0336786 A1* | 11/2014 | Asenjo .................. G06F 3/048 <br> 700/17 |
| 2015/0199615 A1* | 7/2015 | Amendjian ........... G06F 3/0481 <br> 706/11 |
| 2015/0213723 A1* | 7/2015 | Vattikonda .......... G06F 16/9535 <br> 434/322 |
| 2016/0132027 A1 | 5/2016 | Li et al. |

* cited by examiner

State Transition Conditions

| # | Condition | # | Condition | # | Condition |
|---|---|---|---|---|---|
| 1 | Charge Now | 7 | No Energy Savings<br>Not Approaching Target<br>Not First Day Billing Cycle<br>Not Charge Now | 14 | On the Hour<br>Energy Savings<br>Not Approaching Target<br>Sufficient Ice<br>Building Occupied<br>Forecaster Ready<br>Not Charge Now | 21 | On the Hour<br>Energy Savings<br>Not Approaching Target<br>Insufficient Ice<br>Building Occupied<br>Not Charge Now |
| 2 | Forecaster Not Ready<br>Not Charge Now | 8 | Energy Savings<br>Sufficient Ice<br>Not First Day Billing Cycle<br>Forecaster Ready<br>Not Charge Now | 15 | Charge Now | 22 | Charge Now |
| 3 | First Day Billing Cycle<br>Forecaster Ready<br>Not Charge Now | 9 | Charge Now | 16 | Building Unoccupied<br>Not Charge Now | 23 | Building Occupied |
| 4 | No Energy Savings<br>Approaching Target<br>Not First Day Billing Cycle<br>Forecaster Ready<br>Not Charge Now | 10 | Building Unoccupied<br>Not Charge Now | 17 | On the Hour<br>Energy Savings<br>Approaching Target<br>Sufficient Ice<br>Building Occupied<br>Not Charge Now | 24 | Off Peak Hours |
| 5 | Energy Savings<br>Approaching Target<br>Insufficient Ice<br>Not First Day Billing Cycle<br>Forecaster Ready<br>Not Charge Now | 12 | Energy Savings<br>Approaching Target<br>Insufficient Ice<br>Building Occupied<br>Forecaster Ready<br>Not Charge Now | 18 | Charge Now | 25 | Charged |
|  |  |  |  |  |  | 26 | Not Charge Now<br>Charge Schedule |
| 6 | Energy Savings<br>Not Approaching Target<br>Insufficient Ice<br>Not First Day Billing Cycle<br>Not Charge Now | 13 | No Energy Savings<br>Approaching Target<br>Building Occupied<br>Forecaster Ready<br>Not Charge Now | 19 | Building Unoccupied<br>Not Charge Now | 27 | Building Occupied<br>No Charge Schedule |
|  |  |  |  | 20 | Energy Savings<br>Approaching Target<br>Insufficient Ice<br>Building Occupied<br>Not Charge Now | 28 | On Peak Hours<br>No Charge Schedule |
|  |  |  |  |  |  | 29 | Building Occupied |
|  |  |  |  |  |  | 30 | Building Occupied |

FIG. 10 (cont.)

| State Description 1212 | Transition Description 1214 |
|---|---|
| The optimizing controls are currently in chiller priority mode where the chillers will take as much of the building load as possible and the cooling thermal storage will only be discharged if the building load exceeds the sum of the chiller capacities. In this mode the thermal storage system should never be in a charging mode. | The optimizing controls transitioned into the chiller priority mode from the switch to occupied mode. The transition occurred because the cooling thermal storage was not scheduled for charging and the forecaster was not ready (Transition 2). |

Operational Status

1216 →

| Point Name | Expected | Actual | Action |
|---|---|---|---|
| Chiller Plant Availability Enum | avail | avail | none |
| Cooling TES Availability Enum | avail | avail | none |
| Cooling TES Capacity Command | 0% | 0% | none |
| Cooling TES Flow Rate | 0 gpm | 2000 gpm | 1. Override valve # 8 to 0%<br>2. Call Bob at 262-123-4567<br>3. Inspect valve & actuator |

View Fault Details — 1220

Fault Detected: Cooling TES Flow Rate Out of Range
1218

FIG. 12 (cont.)

BUILDING CONTROL SYSTEM WITH ADAPTIVE USER INTERFACE

CROSS-REFERENCE TO RELATED PATENT APPLICATION

This application is a continuation of U.S. patent application Ser. No. 15/232,800, filed Aug. 9, 2016, which is incorporated by reference herein in its entirety for all purposes.

BACKGROUND

The present disclosure relates generally to a control system for a building (e.g., a building HVAC system) or building management system. The present disclosure relates more particularly to a hybrid control system for a building with an adaptive user interface.

A hybrid control system combines the functionality of a discrete control system and a closed loop control system. A discrete control system can be described using a finite state diagram (FSD) and implemented in a finite state machine (FSM). In a discrete control system, a controller evaluates state transition conditions (e.g., using feedback from the controlled system) and transitions between various operating states when one or more of the state transition conditions are satisfied. Each of the operating states in a discrete control system can have a corresponding set of control outputs. In some embodiments, the control outputs in a discrete control system remain constant as long as the controller remains in the same operating state and change only when the controller transitions into a new operating state.

A closed loop control system can be implemented using any of a variety of control techniques (e.g., feedback control, feedforward control, extremum seeking control, proportional-integral control, proportional-integral-derivative control, model predictive control, etc.). In a closed loop control system, a controller modulates a control output (i.e., a manipulated variable) provided to the controlled system over a range of values in order to achieve a desired effect. For example, the controller can modulate the control output to drive a monitored variable to a setpoint. In some embodiments, the controller uses feedback from the controlled system to determine an error between the setpoint and the monitored variable. The controller can variably increase or decrease the control output within the range of values in order to drive the error to zero.

Some hybrid control systems operate in a manner that is easily understandable by a user. For example, a human operator observing the behavior of a simple hybrid control system can easily understand what the system is doing in each of the operating states and why the system is operating in the current operating state. However, it can be difficult for a user to understand the behavior of more complex systems with a greater number of operating states, especially when the state transition conditions are non-intuitive and the closed loop control techniques within the operating states are complicated.

Using conventional interfaces, it can be difficult for a user to understand what the control system is doing and why. For example, the information presented to the user often does not clearly indicate what the control system is doing in each of the operating states and/or why the control system is operating in the current operating state. As a result, some automatic control systems are often manually overridden or disabled because the human operator does not understand whether the system is operating properly. Such manual overrides can reduce system performance and lead to suboptimal operation. It would be desirable to provide a hybrid control system which communicates expected behaviors and explains system operation in a user-friendly manner.

SUMMARY

One implementation of the present disclosure is a building control system. The building control system includes one or more sensors located in a building and configured to provide measurements of a monitored variable in the building, building equipment configured to affect the monitored variable by operating the building equipment, and a hybrid controller configured to receive the measurements from the sensors and provide control signals to the building equipment. The hybrid controller includes a state transition controller, a state history tracker, and an adaptive user interface generator. The state transition controller is configured to transition between multiple discrete operating states by executing state transitions. The state history tracker is configured to record a state history including at least one of a sequence of state transitions executed by the state transition controller and a sequence of operating states resulting from the state transitions. The adaptive user interface generator is configured to generate an adaptive user interface including a representation of the multiple discrete operating states and the state transitions therebetween. The adaptive user interface includes state history controls operable to navigate the state history and select an operating state defined by the state history. The adaptive user interface generator is configured to automatically update the adaptive user interface to provide information about the selected operating state.

In some embodiments, the information about the selected operating state includes an explanation of control operations in the selected operating state. In some embodiments, the adaptive user interface generator is configured to use the state history to identify a state transition executed by the state transition controller to transition into the selected operating state and automatically update the adaptive user interface to provide information about the identified state transition. In some embodiments, the information about the identified state transition includes an explanation of one or more transition conditions which were satisfied to trigger the identified state transition.

In some embodiments, the hybrid controller includes a user identifier configured to identify at least one of a user and a user class to which the adaptive user interface is presented. The hybrid controller can include an adaptive state information generator configured to customize the information about the selected operating state to the identified user or user class.

In some embodiments, the system includes a descriptive text database storing multiple different descriptions of the selected operating state. Each of the multiple different descriptions can correspond to a different user or user class. In some embodiments, the adaptive state information generator is configured to customize the information about the selected operating state by obtaining, from the descriptive text database, the description of the selected operating state corresponding to the identified user or user class.

In some embodiments, the system includes an expected status database storing a set of expected values for data points associated with the selected operating state. The information about the selected operating state can include the set of expected values for the data points associated with the selected operating state. In some embodiments, the information about the selected operating state further includes a set of actual values for the data points associated with the selected operating state. The adaptive user interface generator can be configured to concurrently present both the set of expected values and the set of actual values via the adaptive user interface.

Another implementation of the present disclosure is a building control system. The building control system includes one or more sensors located in a building and configured to provide measurements of a monitored variable in the building, building equipment configured to affect the monitored variable by operating the building equipment, and a hybrid controller configured to receive the measurements from the sensors and provide control signals to the building equipment. The hybrid controller includes a state transition controller, an adaptive user interface generator, a user identifier, and an adaptive state information generator. The state transition controller is configured to transition between multiple discrete operating states by executing state transitions. The adaptive user interface generator is configured to generate an adaptive user interface including information about an operating state selected from the multiple discrete operating states. The user identifier is configured to identify at least one of a user and a user class to which the adaptive user interface is presented. The adaptive state information generator is configured to customize the information about the selected operating state to the identified user or user class.

In some embodiments, the user identifier is configured to identify a preferred learning style for the identified user or user class. The adaptive state information generator can be configured to adapt the information about the selected operating state to the preferred learning style for the identified user or user class. In some embodiments, the user identifier is configured to determine whether the preferred learning style is an auditory learning style. The hybrid controller can include a voice command module configured to present the information about the selected operating state in an auditory format in response to a determination that the preferred learning style is the auditory learning style.

In some embodiments, the information about the selected operating state includes an explanation of control operations in the selected operating state. In some embodiments, the hybrid controller includes a state history tracker configured to record a state history including at least one of a sequence of state transitions executed by the state transition controller and a sequence of operating states resulting from the state transitions.

In some embodiments, the adaptive user interface generator is configured to use the state history to identify a state transition executed by the state transition controller to transition into the selected operating state and automatically update the adaptive user interface to provide information about the identified state transition. In some embodiments, the information about the identified state transition includes an explanation of one or more transition conditions which were satisfied to trigger the identified state transition.

Another implementation of the present disclosure is method for controlling a building system. The method includes receiving, at a hybrid controller, measurements of a monitored variable in a building from one or more sensors located in the building. The method includes transitioning between multiple discrete operating states at the hybrid controller by executing state transitions based on the measurements from the sensors. The method includes providing control signals from the hybrid controller to building equipment that operate to affect the monitored variable while operating in one or more of the discrete operating states. The method includes recording a state history including at least one of a sequence of the executed state transitions and a sequence of operating states resulting from the executed state transitions. The method includes generating an adaptive user interface including a representation of the multiple discrete operating states and the state transitions therebetween. The method includes selecting an operating state defined by the state history based on user input received via the adaptive user interface and automatically updating the adaptive user interface to provide information about the selected operating state.

In some embodiments, the method includes receiving the user input via state history controls of the adaptive user interface and navigating between a current operating state and one or more past operating states defined by the state history based on the user input received via the state history controls.

In some embodiments, the method includes identifying at least one of a user and a user class to which the adaptive user interface is presented and customizing the information about the selected operating state to the identified user or user class. In some embodiments, customizing the information about the selected operating state includes storing multiple different descriptions of the selected operating state in a descriptive text database. Each of the multiple different descriptions can correspond to a different user or user class. Customizing the information about the selected operating state can further includes identifying, in the descriptive text database, the description of the selected operating state corresponding to the identified user or user class and obtaining the identified description of the selected operating state from a descriptive text database.

In some embodiments, updating the adaptive user interface to provide information about the selected operating state includes storing a set of expected values for data points associated with the selected operating state in an expected status database, obtaining a set of actual values for the data points associated with the selected operating state, and concurrently presenting both the set of expected values and the set of actual values via the adaptive user interface.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Figure 1:
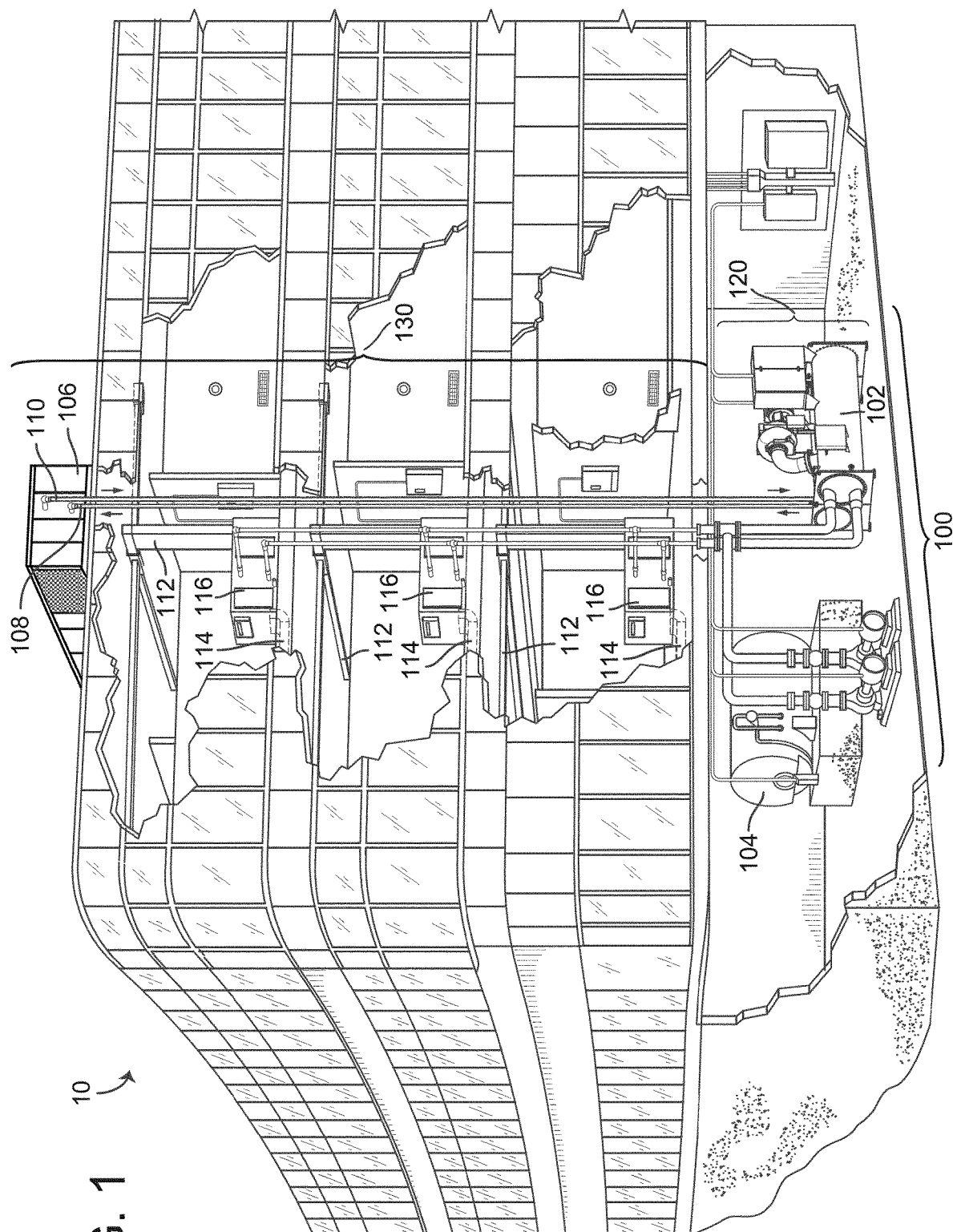
FIG. 1 is a drawing of a building equipped with a HVAC system, according to some embodiments.

Referring generally to the FIGURES, a building control system with an adaptive user interface is shown, according to various exemplary embodiments. The building control system can include a hybrid controller. The hybrid controller can operate as a finite state machine to evaluate state transition conditions and transition between multiple operating states. The hybrid controller can also operate as a closed loop controller within each of the operating states.

The hybrid controller can generate and provide an adaptive user interface which presents information in a user friendly way. Advantageously, the user interface can be customized by the hybrid controller to tailor the presented information to a particular user or user class. For example, the hybrid controller can identify the current user (e.g., via login credentials, facial recognition, voice recognition, etc.) and generate a user interface which presents set of information customized to the identified user. In various embodiments, the adaptive user interface can be customized to individual users and/or customized to various classes of users who can interact with the hybrid controller (e.g., service technicians, operations staff, building occupant, etc.).

The adaptive user interface can present information about the current operating state of the hybrid controller, a history of state transitions or previous operating states, the expected behaviors of the system in the current operating state, and/or other information which may be relevant to a particular user or user class. The hybrid controller can generate descriptive text, charts, graphs, or other interface elements which may be most useful to a particular user or user class. For example, if the user is identified as a member of the user class "operations staff," the hybrid controller can generate a user interface which includes descriptive text customized to operations staff members to help explain the expected behavior of the system in the current operating state.

The hybrid controller can customize the adaptive user interface to present information with an appropriate level of detail for the user and in a format that is most understandable by the user. For example, service technicians can be provided with detailed diagnostic information and in-depth descriptions of system operation which may be useful when servicing the BMS equipment, whereas building owners can be provided with more general information customized to be readily understandable by individuals without extensive knowledge of building automation systems or building controls. In some embodiments, the hybrid controller presents information in a format which best suits the user's individual learning style. For example, the hybrid controller can present information in visual format (e.g., charts, graphs, tables, etc.) to users who are identified as visual learners, whereas the hybrid controller can present information in an audio format (e.g., using a text-to-speech module or voice command module) to users who are identified as auditory learners. These and other features of the hybrid controller are described in greater detail below.

Building Management System and HVAC System

Referring now to FIGS. 1-5, an exemplary building 10 and HVAC system 100 in which the systems and methods of the present disclosure can be implemented are shown, according to an exemplary embodiment. Referring particularly to FIG. 1, a perspective view of a building 10 is shown. Building 10 is served by a building management system (BMS). A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof. Examples of BMSs which can be implemented in building 10 are described in greater detail with reference to FIGS. 4-5.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve setpoint conditions for the building zone.

Waterside System

Figure 2:
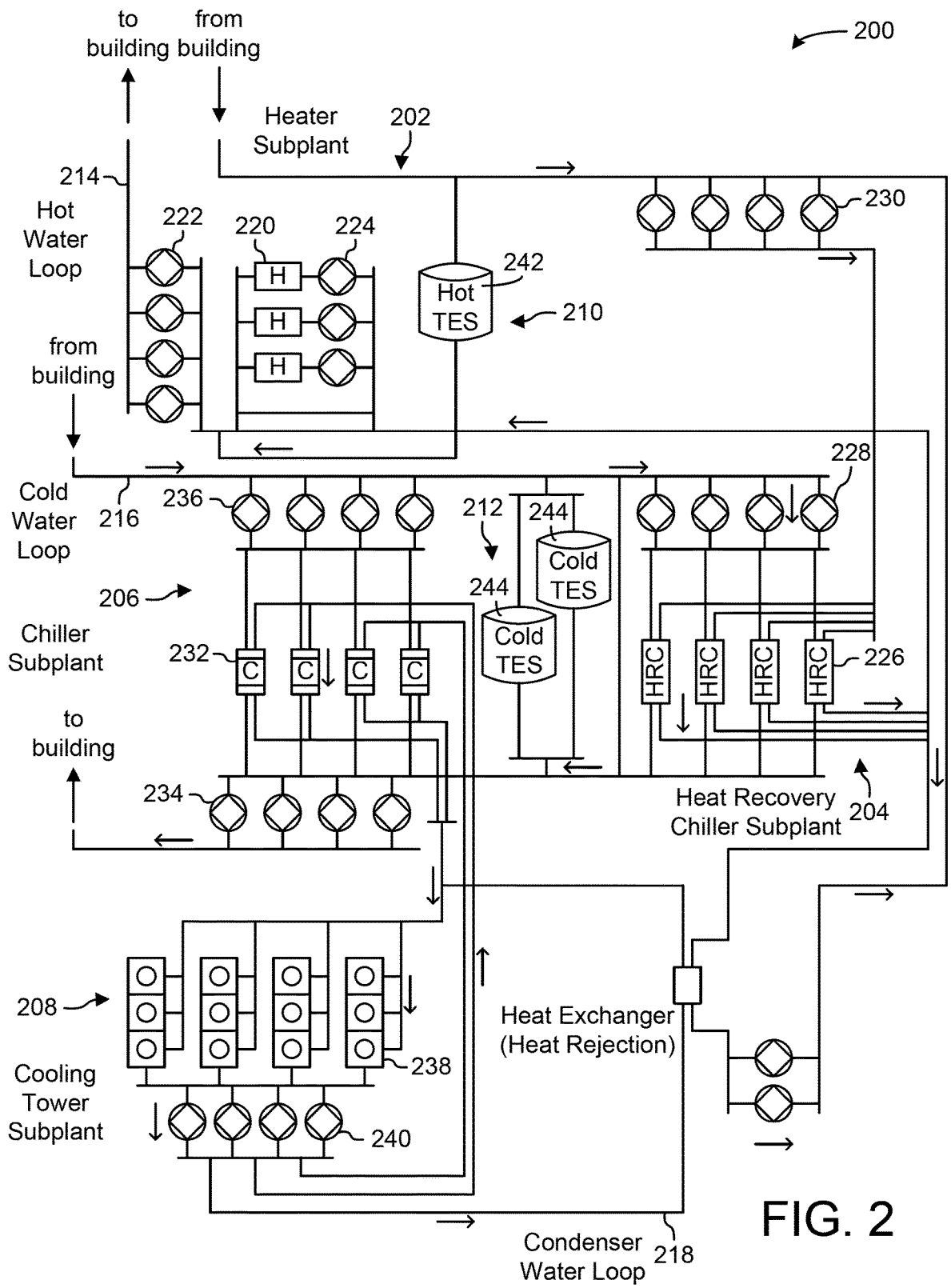
FIG. 2 is a schematic diagram of a waterside system which can be used in conjunction with the building of FIG. 1, according to some embodiments.

Referring now to FIG. 2, a block diagram of a waterside system 200 is shown, according to an exemplary embodiment. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve the thermal energy loads. In other embodiments, subplants 202-212 can provide heating and/or cooling directly to the building or campus without requiring an intermediate heat transfer fluid. These and other variations to waterside system 200 are within the teachings of the present invention.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Figure 3:
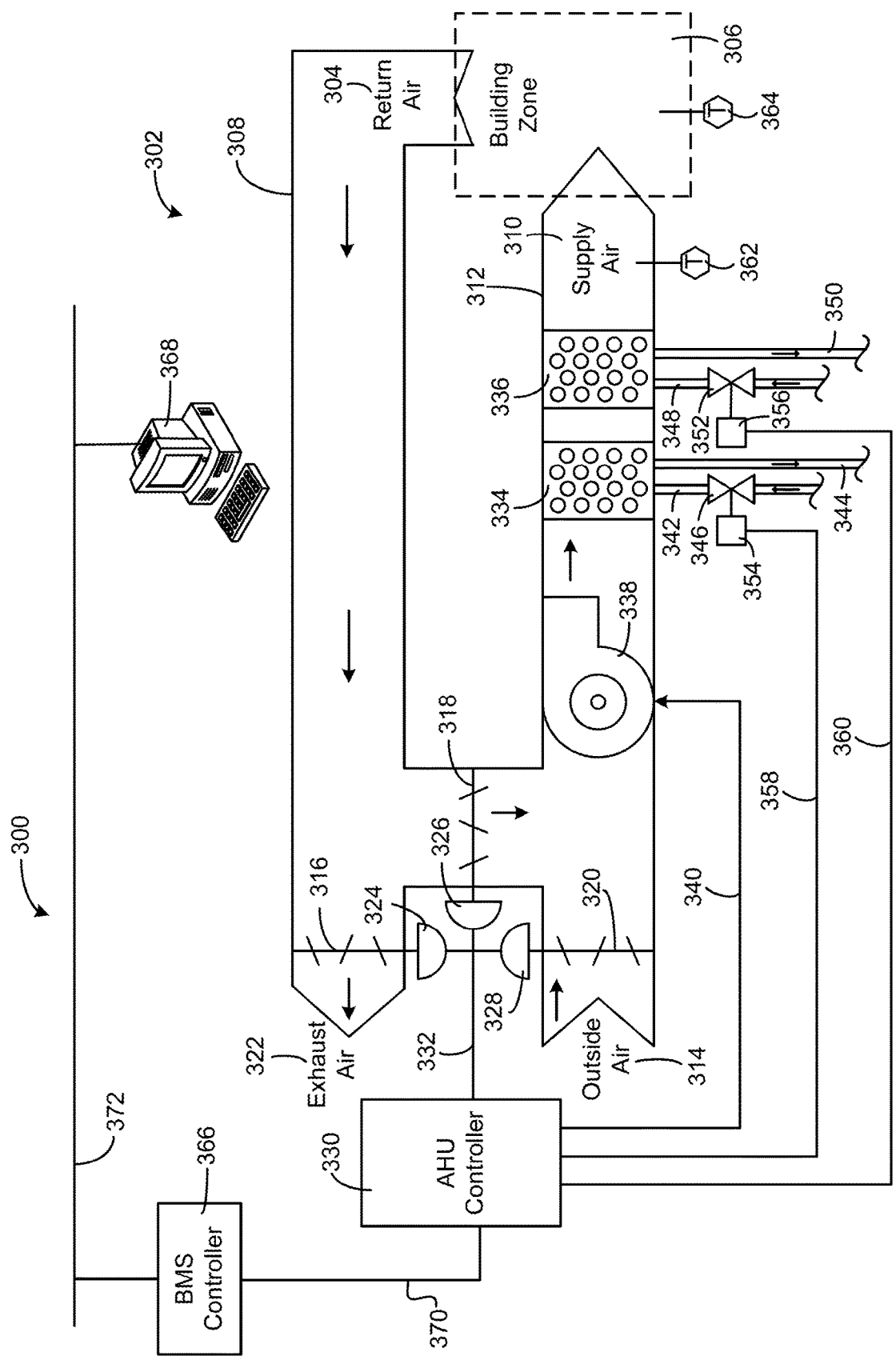
FIG. 3 is a schematic diagram of an airside system which can be used in conjunction with the building of FIG. 1, according to some embodiments.

Referring now to FIG. 3, a block diagram of an airside system 300 is shown, according to an exemplary embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 can provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Building Management Systems

Figure 4:
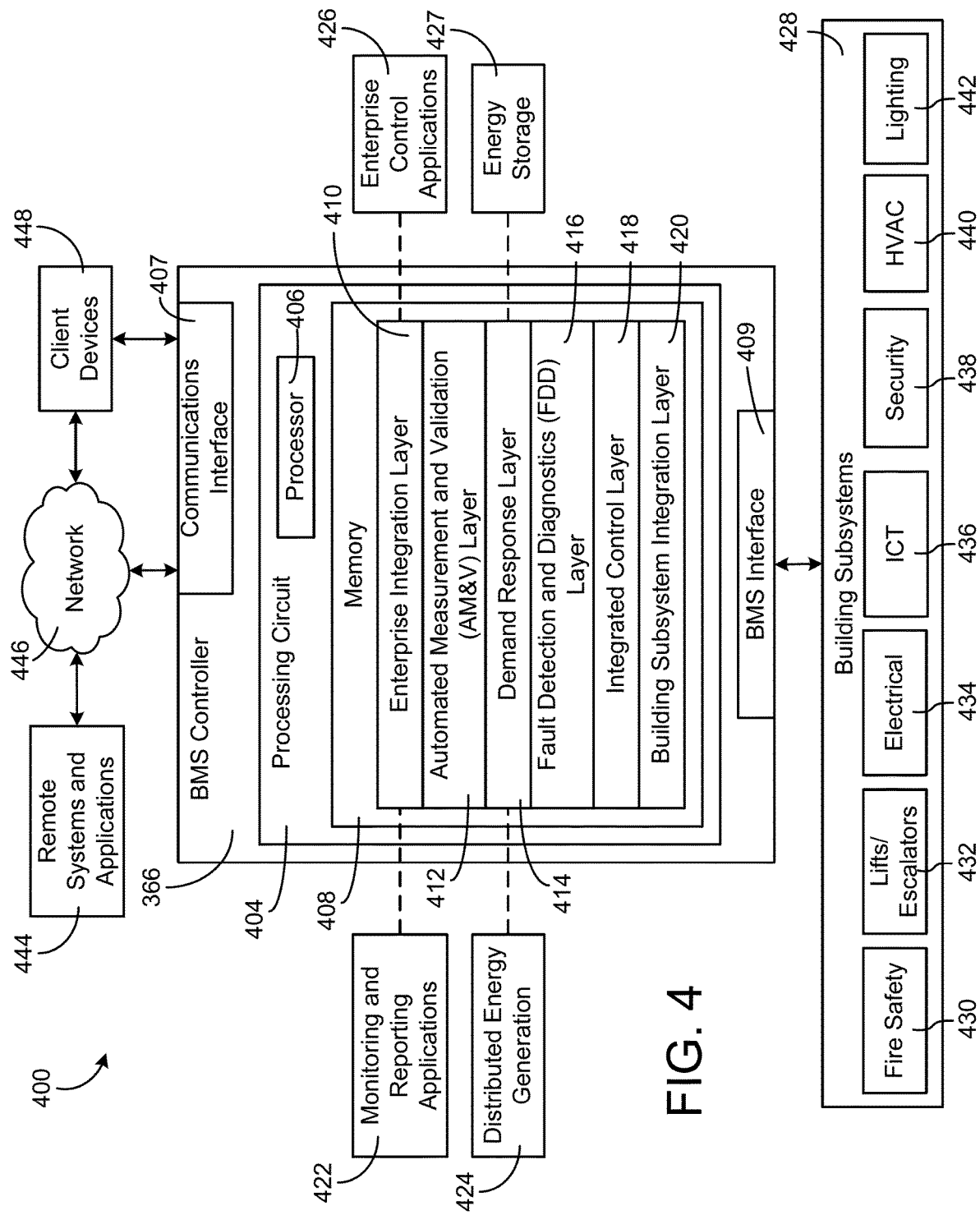
FIG. 4 is a block diagram of a building management system (BMS) which can be used to monitor and control the building of FIG. 1, according to some embodiments.

Referring now to FIG. 4, a block diagram of a building management system (BMS) 400 is shown, according to an exemplary embodiment. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 can facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 can also facilitate communications between BMS controller 366 and client devices 448. BMS interface 409 can facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a WiFi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 can also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 can receive sensor data and input signals from building subsystems 428 and provide output data and control signals to building subsystems 428. Building subsystem integration layer 420 can also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 can receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 can also include control logic configured to determine when to utilize stored energy. For example, demand response layer 414 can determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models can represent collections of building equipment (e.g., subplants, chiller arrays, etc.) or individual devices (e.g., individual chillers, heaters, pumps, etc.).

Demand response layer 414 can further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In an exemplary embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration can reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints can also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 can compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 can receive data inputs from integrated control layer 418, directly from one or more building subsystems or devices, or from another data source. FDD layer 416 can automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to an exemplary embodiment, FDD layer 416 (or a policy executed by an integrated control engine or business rules engine) can shut-down systems or direct control activities around faulty devices or systems to reduce energy waste, extend equipment life, or assure proper control response.

FDD layer 416 can be configured to store or access a variety of different system data stores (or data points for live data). FDD layer 416 can use some content of the data stores to identify faults at the equipment level (e.g., specific chiller, specific AHU, specific terminal unit, etc.) and other content to identify faults at component or subsystem levels. For example, building subsystems 428 can generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Figure 5:
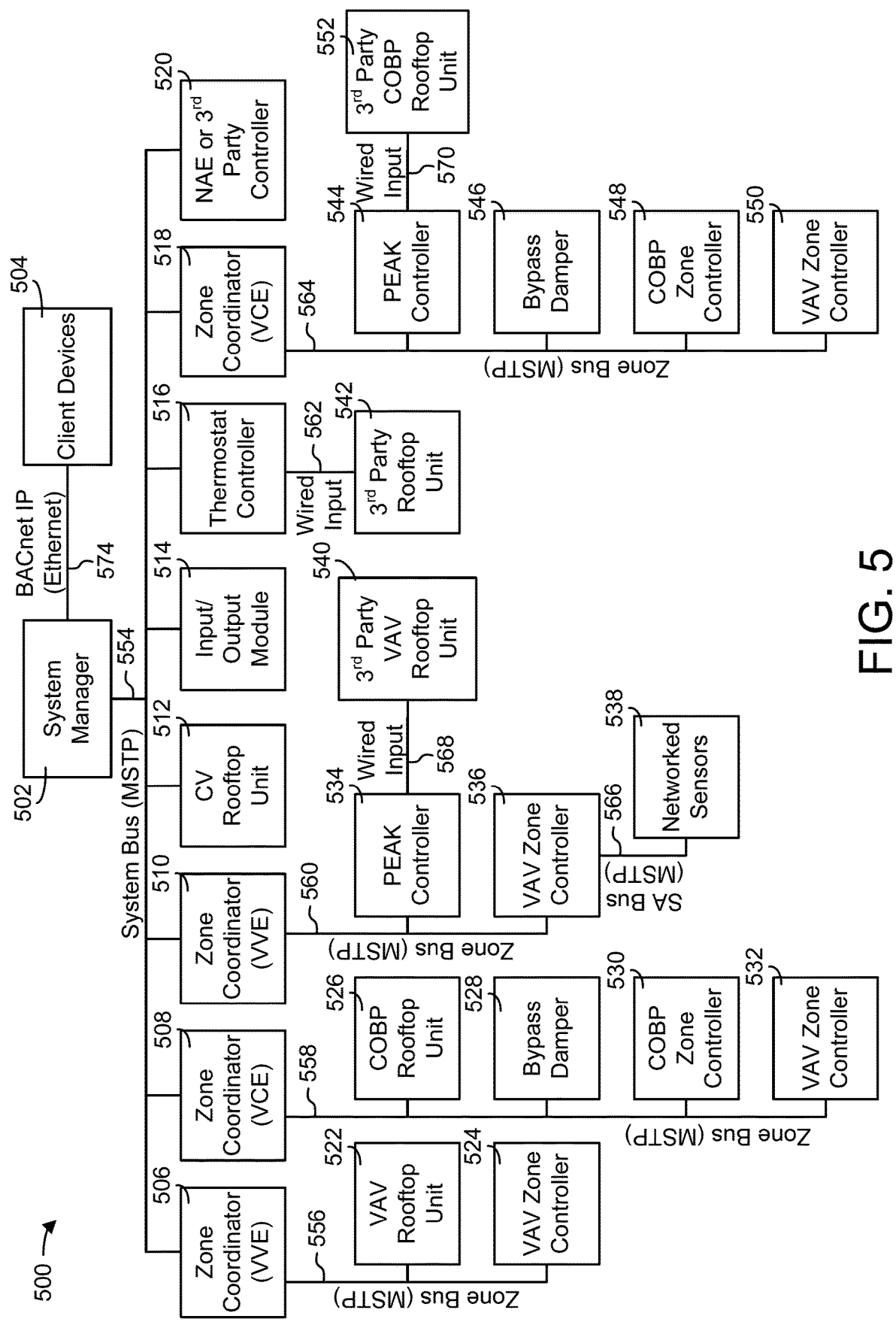
FIG. 5 is a block diagram of another BMS which can be used to monitor and control the building of FIG. 1, according to some embodiments.

Referring now to FIG. 5, a block diagram of another building management system (BMS) 500 is shown, according to some embodiments. BMS 500 can be implemented in building 10 and used to monitor and control the devices of HVAC system 100, waterside system 200, airside system 300, building subsystems 428, as well as other types of BMS devices (e.g., lighting equipment, security equipment, etc.) and/or HVAC equipment.

BMS 500 provides a system architecture that facilitates automatic equipment discovery and equipment model distribution. Equipment discovery can occur on multiple levels of BMS 500 across multiple different communications busses (e.g., a system bus 554, zone buses 556-560 and 564, sensor/actuator bus 566, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 500 can begin interacting with the new device (e.g., sending control signals, using data from the device) without user interaction.

Some devices in BMS 500 present themselves to the network using equipment models. An equipment model defines equipment object attributes, view definitions, schedules, trends, and the associated BACnet value objects (e.g., analog value, binary value, multistate value, etc.) that are used for integration with other systems. Some devices in BMS 500 store their own equipment models. Other devices in BMS 500 have equipment models stored externally (e.g., within other devices). For example, a zone coordinator 508 can store the equipment model for a bypass damper 528. In some embodiments, zone coordinator 508 automatically creates the equipment model for bypass damper 528 or other devices on zone bus 558. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 5, BMS 500 is shown to include a system manager 502; several zone coordinators 506, 508, 510 and 518; and several zone controllers 524, 530, 532, 536, 548, and 550. System manager 502 can communicate with client devices 504 (e.g., user devices, desktop computers, laptop computers, mobile devices, etc.) via a data communications link 574 (e.g., BACnet IP, Ethernet, wired or wireless communications, etc.). System manager 502 can provide a user interface to client devices 504 via data communications link 574. The user interface may allow users to monitor and/or control BMS 500 via client devices 504.

In some embodiments, system manager 502 is connected with zone coordinators 506-510 and 518 via a system bus 554. System manager 502 can be configured to communicate with zone coordinators 506-510 and 518 via system bus 554 using a master-slave token passing (MSTP) protocol or any other communications protocol. System bus 554 can also connect system manager 502 with other devices such as a constant volume (CV) rooftop unit (RTU) 512, an input/output module (IOM) 514, a thermostat controller 516 (e.g., a TEC5000 series thermostat controller), and a network automation engine (NAE) or third-party controller 520. RTU 512 can be configured to communicate directly with system manager 502 and can be connected directly to system bus 554. Other RTUs can communicate with system manager 502 via an intermediate device. For example, a wired input 562 can connect a third-party RTU 542 to thermostat controller 516, which connects to system bus 554.

System manager 502 can provide a user interface for any device containing an equipment model. Devices such as zone coordinators 506-510 and 518 and thermostat controller 516 can provide their equipment models to system manager 502 via system bus 554. In some embodiments, system manager 502 automatically creates equipment models for connected devices that do not contain an equipment model (e.g., IOM 514, third party controller 520, etc.). For example, system manager 502 can create an equipment model for any device that responds to a device tree request. The equipment models created by system manager 502 can be stored within system manager 502. System manager 502 can then provide a user interface for devices that do not contain their own equipment models using the equipment models created by system manager 502. In some embodiments, system manager 502 stores a view definition for each type of equipment connected via system bus 554 and uses the stored view definition to generate a user interface for the equipment.

Each zone coordinator 506-510 and 518 can be connected with one or more of zone controllers 524, 530-532, 536, and 548-550 via zone buses 556, 558, 560, and 564. Zone coordinators 506-510 and 518 can communicate with zone controllers 524, 530-532, 536, and 548-550 via zone busses 556-560 and 564 using a MSTP protocol or any other communications protocol. Zone busses 556-560 and 564 can also connect zone coordinators 506-510 and 518 with other types of devices such as variable air volume (VAV) RTUs 522 and 540, changeover bypass (COBP) RTUs 526 and 552, bypass dampers 528 and 546, and PEAK controllers 534 and 544.

Zone coordinators 506-510 and 518 can be configured to monitor and command various zoning systems. In some embodiments, each zone coordinator 506-510 and 518 monitors and commands a separate zoning system and is connected to the zoning system via a separate zone bus. For example, zone coordinator 506 can be connected to VAV RTU 522 and zone controller 524 via zone bus 556. Zone coordinator 508 can be connected to COBP RTU 526, bypass damper 528, COBP zone controller 530, and VAV zone controller 532 via zone bus 558. Zone coordinator 510 can be connected to PEAK controller 534 and VAV zone controller 536 via zone bus 560. Zone coordinator 518 can be connected to PEAK controller 544, bypass damper 546, COBP zone controller 548, and VAV zone controller 550 via zone bus 564.

A single model of zone coordinator 506-510 and 518 can be configured to handle multiple different types of zoning systems (e.g., a VAV zoning system, a COBP zoning system, etc.). Each zoning system can include a RTU, one or more zone controllers, and/or a bypass damper. For example, zone coordinators 506 and 510 are shown as Verasys VAV engines (VVEs) connected to VAV RTUs 522 and 540, respectively. Zone coordinator 506 is connected directly to VAV RTU 522 via zone bus 556, whereas zone coordinator 510 is connected to a third-party VAV RTU 540 via a wired input 568 provided to PEAK controller 534. Zone coordinators 508 and 518 are shown as Verasys COBP engines (VCEs) connected to COBP RTUs 526 and 552, respectively. Zone coordinator 508 is connected directly to COBP RTU 526 via zone bus 558, whereas zone coordinator 518 is connected to a third-party COBP RTU 552 via a wired input 570 provided to PEAK controller 544.

Zone controllers 524, 530-532, 536, and 548-550 can communicate with individual BMS devices (e.g., sensors, actuators, etc.) via sensor/actuator (SA) busses. For example, VAV zone controller 536 is shown connected to networked sensors 538 via SA bus 566. Zone controller 536 can communicate with networked sensors 538 using a MSTP protocol or any other communications protocol. Although only one SA bus 566 is shown in FIG. 5, it should be understood that each zone controller 524, 530-532, 536, and 548-550 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 524, 530-532, 536, and 548-550 can be configured to monitor and control a different building zone. Zone controllers 524, 530-532, 536, and 548-550 can use the inputs and outputs provided via their SA busses to monitor and control various building zones. For example, a zone controller 536 can use a temperature input received from networked sensors 538 via SA bus 566 (e.g., a measured temperature of a building zone) as feedback in a temperature control algorithm. Zone controllers 524, 530-532, 536, and 548-550 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

Hybrid Control System

Figure 6:
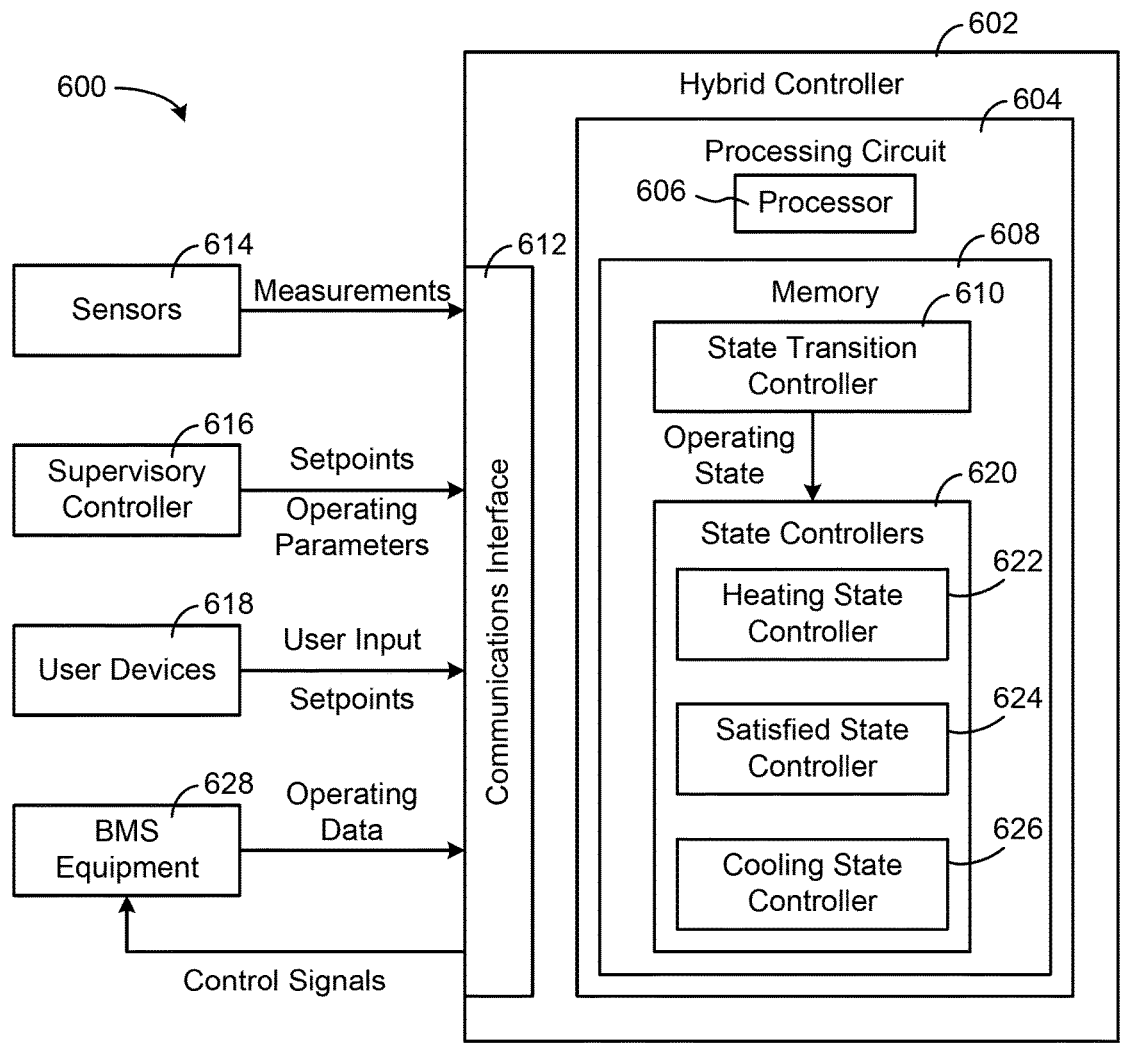
FIG. 6 is a block diagram of a hybrid control system which can be used to monitor and control the building of FIG. 1, according to some embodiments.

Referring now to FIG. 6, a hybrid control system 600 is shown, according to an exemplary embodiment. Hybrid control system 600 combines the functionality of a discrete control system and a closed loop control system. A discrete control system can be described using a finite state diagram (FSD) and implemented in a finite state machine (FSM). In a discrete control system, a controller evaluates state transition conditions (e.g., using feedback from the controlled system) and transitions between various operating states when one or more of the state transition conditions are satisfied. Each of the operating states in a discrete control system can have a corresponding set of control outputs. In some embodiments, the control outputs in a discrete control system remain constant as long as the controller remains in the same operating state and change only when the controller transitions into a new operating state.

A closed loop control system can be implemented using any of a variety of control techniques (e.g., feedback control, feedforward control, extremum seeking control, proportional-integral control, proportional-integral-derivative control, model predictive control, etc.). In a closed loop control system, a controller modulates a control output (i.e., a manipulated variable) provided to the controlled system over a range of values in order to achieve a desired effect. For example, the controller can modulate the control output to drive a monitored variable to a setpoint. In some embodiments, the controller uses feedback from the controlled system to determine an error between the setpoint and the monitored variable. The controller can variably increase or decrease the control output within the range of values in order to drive the error to zero.

Hybrid control system 600 includes both discrete control elements and closed loop control elements. For example, hybrid control system 600 is shown to include a hybrid controller 602 having a state transition controller 610 and a plurality of state controllers 620 (i.e., heating state controller 622, satisfied state controller 624, and cooling state controller 626). State transition controller 610 can operate as a finite state machine to evaluate state transition conditions and transition between various operating states. The state transition conditions and the logic used by state transition controller 610 can be stored in a database for later retrieval. In some embodiments, state transition controller 610 provides an indication of the current operating state to state controllers 620.

Each of state controllers 620 can operate as a closed loop controller within a particular operating state. In some embodiments, each state controller 620 becomes active when state transition controller 610 transitions into the corresponding operating state and inactive when state transition controller 610 transitions out of the corresponding operating state. In some embodiments, each of state controllers 620 uses a different control algorithm and/or different control logic. This allows hybrid controller 602 to function as multiple different controllers, each of which controls the operation of system 600 in a particular operating state.

Hybrid control system 600 can decompose a complicated system into a multiplicity of smaller systems or operating states with clearly-defined interactions between states (i.e., the interactions defined by the state transition conditions). In some embodiments, hybrid controller 602 uses one or more model-based design (MBD) methodologies to exploit advantages of this decomposition. The advantages of MBD are numerous including, for example, shorter development times more robust operation due to logic simplification, automatic code generation, availability of a common design environment, and easy reuse of test cases.

Hybrid controller 602 can use any of a variety of MBD tools (e.g., Mathworks) to model the discrete state transition logic and system operation in each of the operating states. For example, hybrid controller 602 can use the "State Flow" toolbox of Mathworks to model the discrete state transition logic. Hybrid controller 602 can use the "Simulink" toolbox of Mathworks to model the closed loop control logic within each operating state. Several examples of such models are described in greater detail with reference to FIGS. 7-9.

Still referring to FIG. 6, hybrid control system 600 is shown to include sensors 614, a supervisory controller 616, user devices 618, and building management system (BMS) equipment 628. Sensors 614 can include any of a variety of sensors (e.g., temperature sensors, humidity sensors, flow rate sensors, pressure sensors, voltage sensors, electric current sensors, light sensors, etc.) configured to measure one or more monitored variables in the controlled system. Sensors 614 can provide measurements as inputs to hybrid controller 602 via communications interface 612. In some embodiments, sensors 614 provide a feedback signal to hybrid controller 602 indicating the value of a variable of interest in the controlled system (e.g., building zone temperature, building zone humidity, system power consumption, etc.). Hybrid controller 602 can use the measurements from sensors 614 to evaluate state transition conditions and/or to perform closed loop control operations within various operating states.

Supervisory controller 616 can include one or more devices or systems (e.g., servers, supervisory controllers, subsystem controllers, etc.) that serve as system level controllers, application or data servers, head nodes, or master controllers for hybrid control system 600 and/or other controllable systems that serve building 10. Supervisory controller 616 can communicate with multiple downstream building systems or subsystems (e.g., hybrid control system 600, a security system, a lighting system, waterside system 200, airside system 400, BMS 400, BMS 500, etc.) via a communications link according to like or disparate protocols (e.g., LON, BACnet, etc.). Supervisory controller 616 can provide hybrid controller with setpoints, operating parameters (e.g., controller tuning parameters, system models, threshold values, etc.), and other types of data inputs via communications interface 612. Hybrid controller 602 can use the setpoints and operating parameters from supervisory controller 616 to evaluate state transition conditions and/or to perform closed loop control operations within various operating states.

User devices 618 can include any of a variety of user-operable devices configured to facilitate user interaction with hybrid controller 602 and/or hybrid control system 600. For example, user devices 618 can include a computer workstation, a desktop computer, a laptop computer, a tablet, a smartphone, a PDA, or any other type of mobile or non-mobile device. User devices 618 can include user interface elements (e.g., electronic display screens, touchscreen displays, keyboards, speakers, buttons, dials, etc.) configured to receive input from a user and provide output to a user. User devices 618 can interact with hybrid controller 602 via communications interface 612 to monitor system operation and provide input to hybrid controller 602. For example, user devices 618 can allow a user to provide hybrid controller 602 with setpoints, operating parameters, manual values for measured variables, operating commands, manual state transition commands, and/or other types of user input. Hybrid controller 602 can use the input from user devices 618 to evaluate state transition conditions and/or to perform closed loop control operations within various operating states.

BMS equipment 628 can include any of a variety of operable systems or devices in the BMS that serves building 10. BMS equipment 628 can include any of the systems or devices of HVAC system 100, waterside system 200, or airside system 300, as described with reference to FIGS. 1-3. For example, BMS equipment 628 can include one or more chillers, boilers, AHUs, economizers, controllers, actuators, fans, pumps, electronic valves, and/or other types of equipment which can be operated by hybrid controller 602 to affect a variable state or condition (e.g., temperature, humidity, airflow, lighting, etc.) in or around building 10. BMS equipment 628 can include any of the systems or devices of building subsystems 428 as described with reference to FIG. 4 (e.g., electrical equipment, ICT equipment, security equipment, HVAC equipment, lighting equipment, lifts/escalators, fire safety equipment, etc.) and/or any of the systems or devices of BMS 500 as described with reference to FIG. 5 (e.g., zone coordinators, rooftop units, VAV units, bypass dampers, etc.). BMS equipment 628 can provide operating data to hybrid controller 602 and can receive control signals from hybrid controller 602. In some embodiments, BMS equipment 628 operate according to the control signals to affect one or more of the variables measured by sensors 614.

Still referring to FIG. 6, hybrid controller 602 is shown to include a communications interface 612 and a processing circuit 604. Communications interface 612 can include wired or wireless interfaces (e.g., jacks, antennas, transmitters, receivers, transceivers, wire terminals, etc.) for conducting data communications with various systems, devices, or networks. For example, communications interface 612 can include an Ethernet card and port for sending and receiving data via an Ethernet-based communications network and/or a WiFi transceiver for communicating via a wireless communications network. Communications interface 612 can be configured to communicate via local area networks or wide area networks (e.g., the Internet, a building WAN, etc.) and may use a variety of communications protocols (e.g., BACnet, IP, LON, etc.).

Communications interface 612 can be a network interface configured to facilitate electronic data communications between controller 602 and various external systems or devices (e.g., sensors 614, supervisory controller 616, user devices 618, BMS equipment 628, etc.). For example, controller 602 can receive setpoints and operating parameters from supervisory controller 616 via communications interface 612. Controller 602 can receive measurements from sensors 614 via communications interface 612. Controller 602 can use communications interface 612 to send control signals to BMS equipment 628. In some embodiments, controller 602 provides user interfaces and other information to user devices 618 via communications interface 612.

Processing circuit 604 is shown to include a processor 606 and memory 608. Processor 606 can be a general purpose or specific purpose processor, an application specific integrated circuit (ASIC), one or more field programmable gate arrays (FPGAs), a group of processing components, or other suitable processing components. Processor 606 can be configured to execute computer code or instructions stored in memory 608 or received from other computer readable media (e.g., CDROM, network storage, a remote server, etc.).

Memory 608 can include one or more devices (e.g., memory units, memory devices, storage devices, etc.) for storing data and/or computer code for completing and/or facilitating the various processes described in the present disclosure. Memory 608 can include random access memory (RAM), read-only memory (ROM), hard drive storage, temporary storage, non-volatile memory, flash memory, optical memory, or any other suitable memory for storing software objects and/or computer instructions. Memory 608 can include database components, object code components, script components, or any other type of information structure for supporting the various activities and information structures described in the present disclosure. Memory 608 can be communicably connected to processor 606 via processing circuit 604 and can include computer code for executing (e.g., by processor 606) one or more processes described herein.

State Transition Diagram

Figure 7:
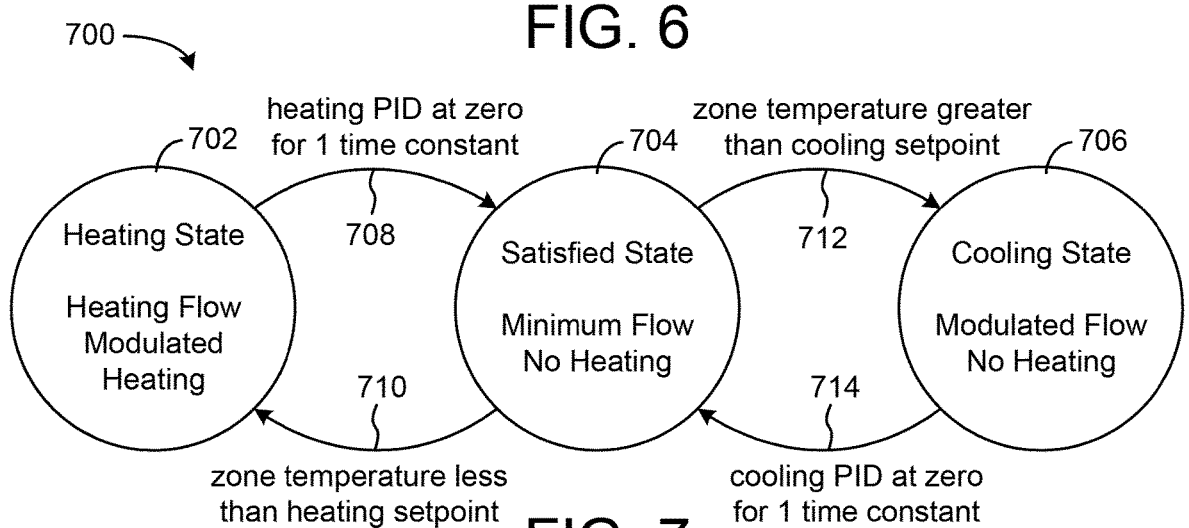
FIG. 7 is a state transition diagram illustrating several discrete operating states and state transitions which can be used by the hybrid control system of FIG. 6, according to some embodiments.

Referring now to FIG. 7, a state transition diagram 700 illustrating the operation of hybrid control system 600 is shown, according to an exemplary embodiment. In some embodiments, state transition diagram 700 is a simplified example of a hybrid system design for a variable air volume controller with heating and cooling capabilities. State transition diagram 700 is shown to include a plurality of operating states 702-706 (i.e., a heating state 702, a satisfied state 704, and a cooling state 706) and state transition conditions 708-714. Although only three operating states 702-706 are shown in state transition diagram 700, it should be understood that state transition diagram 700 can include any number of operating states to model systems of various complexity. In some embodiments, various sub-states can be nested within one or more of operating states 702-706. However, such sub-states are omitted from state transition diagram 700 for further simplification. A more complex state transition diagram is described in detail with reference to FIG. 10.

State transition controller 610 can evaluate state transition conditions 708-714 (e.g., using data received at communications interface 612) and can transition between operating states 702-706 based on a result of the evaluation. State transition conditions 708-714 can involve time comparisons and/or value comparisons. For example, state transition controller 610 can transition from heating state 702 to satisfied state 704 in response to a determination that state transition condition 708 is satisfied (i.e., heating PID at zero for 1 time constant) and can transition from satisfied state 704 to cooling state 706 in response to a determination that state transition condition 712 is satisfied (i.e., zone temperature greater than cooling setpoint). Similarly, state transition controller 610 can transition from cooling state 706 to satisfied state 704 in response to a determination that state transition condition 714 is satisfied (i.e., cooling PID at zero for 1 time constant) and can transition from satisfied state 704 to heating state 702 in response to a determination that state transition condition 710 is satisfied (i.e., zone temperature less than heating setpoint).

Each of state controllers 620 can operate as a closed loop controller within the corresponding operating state 702-706. For example, heating state controller 622 can control system operation in a heating state 702, satisfied state controller 624 can control system operation in a satisfied state 704, and cooling state controller 626 can control system operation in a cooling state 706. In some embodiments, each of state controllers 620 becomes active in response to a determination that state transition controller 610 has transitioned into the corresponding operating state and inactive in response to a determination that state transition controller 610 has transitioned out of the corresponding operating state. For example, heating state controller 622 can become active in response to a determination that state transition controller 610 has transitioned into heating state 702 and inactive in response to a determination that state transition controller 610 has transitioned out of heating state 702. Similarly, cooling state controller 626 can become active in response to a determination that state transition controller 610 has transitioned into cooling state 706 and inactive in response to a determination that state transition controller 610 has transitioned out of cooling state 706.

In some embodiments, each of state controllers 620 uses a different control algorithm, different control logic, and/or a different control methodology (e.g., PID control, extremum seeking control, model predictive control, etc.). This allows hybrid controller 602 to function as multiple different controllers, each of which controls the operation of system 600 in a designated operating state. For example, heating state controller 622 can control system operation in heating state 702 by operating BMS equipment 628 to provide a heating flow and modulating the amount of heating provided. However, cooling state controller 626 can control system operation in cooling state 706 by modulating the flow and providing no heating. In some embodiments, each of state controllers 620 uses a different system model (e.g., a different Simulink model) to represent system operation in the corresponding operating state. Several examples of such models are described in greater detail with reference to FIGS. 8-9.

Closed Loop Control Models

Figure 8:
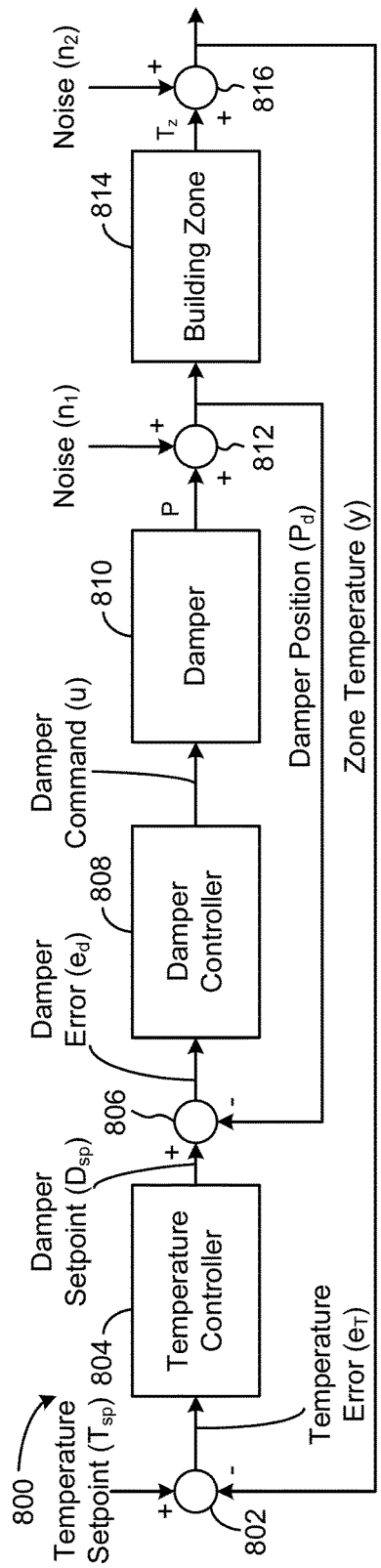
FIG. 8 is a block diagram illustrating a closed loop control technique which can be used by the hybrid control system of FIG. 6, according to some embodiments.

Referring now to FIG. 8, a block diagram of a closed loop control model 800 is shown, according to an exemplary embodiment. Model 800 is an example of a system model which can be implemented in a model-based design (MBD) environment (e.g., the Mathworks Simulink toolbox) to control the operation of hybrid control system 600 in a particular operating state. In some embodiments, model 800 is used by cooling state controller 626 to control the operation of system 600 in cooling state 706. Other closed loop control models can be used by heating state controller 622 and satisfied state controller 624 to control the operation of system 600 in heating state 702 and satisfied state 704.

Model 800 is shown to include a temperature controller 804 and a damper controller 808. Controllers 804 and 808 can be implemented as control objects within the MBD environment. In some embodiments, temperature controller 804 receives a temperature error signal $e_T$, which can be calculated by subtractor element 802 by subtracting the measured zone temperature y from the temperature setpoint $T_{sp}$ (i.e., $e_T=T_{sp}-y$). Temperature controller 804 can generate a damper setpoint $D_{sp}$ as a function of the temperature error signal $e_T$ (i.e., $D_{sp}=f(e_T)$) using any of a variety of control techniques (e.g., PI control, PID control, extremum seeking control, etc.). Subtractor element 806 subtracts the measured damper position $P_d$ from the damper setpoint $D_{sp}$ to calculate the damper error $e_d$ (i.e., $e_d=D_{sp}-P_d$). Damper controller 808 can generate the damper command signal u as a function of the damper error $e_d$ (i.e., $u=f(e_d)$) using any of a variety of control techniques.

Model 800 is shown to include a damper object 810 and a building zone object 814. Objects 810 and 814 can be implemented using various plant models and/or equipment models within the MBD environment. Damper object 810 can receive the damper command u from damper controller 808. Damper object 810 can be linked to a physical damper (e.g., via an actuator or other BMS equipment) and configured to adjust the physical position of the damper based on the damper command u. In some embodiments, damper object 810 uses the damper command u from damper controller 808 to determine a resultant damper position P. For example, damper object 810 can include a damper model which relates the damper position P to the damper command u (e.g., $P=f(u)$). The damper position P combines with measurement noise $n_1$ at summation block 812 to form the measured damper position $P_d$ (i.e., $P_d=P+n_1$).

Building zone object 814 represents a physical building zone which receives an air flow rate corresponding to the damper position $P_d$. Building zone object 814 can include a zone model describing the dynamics of the building zone. In some embodiments, the zone model includes a transfer function relating the temperature $T_z$ of the building zone to the damper position $P_d$ (e.g., $T_z=f(P_d)$). Building zone object 814 can use the building zone model to determine a building zone temperature $T_z$ that results from the damper position $P_d$. The building zone temperature $T_z$ combines with measurement noise $n_2$ at summation block 816 to form the measured zone temperature y (i.e., $y=T_z+n_2$).

Figure 9:
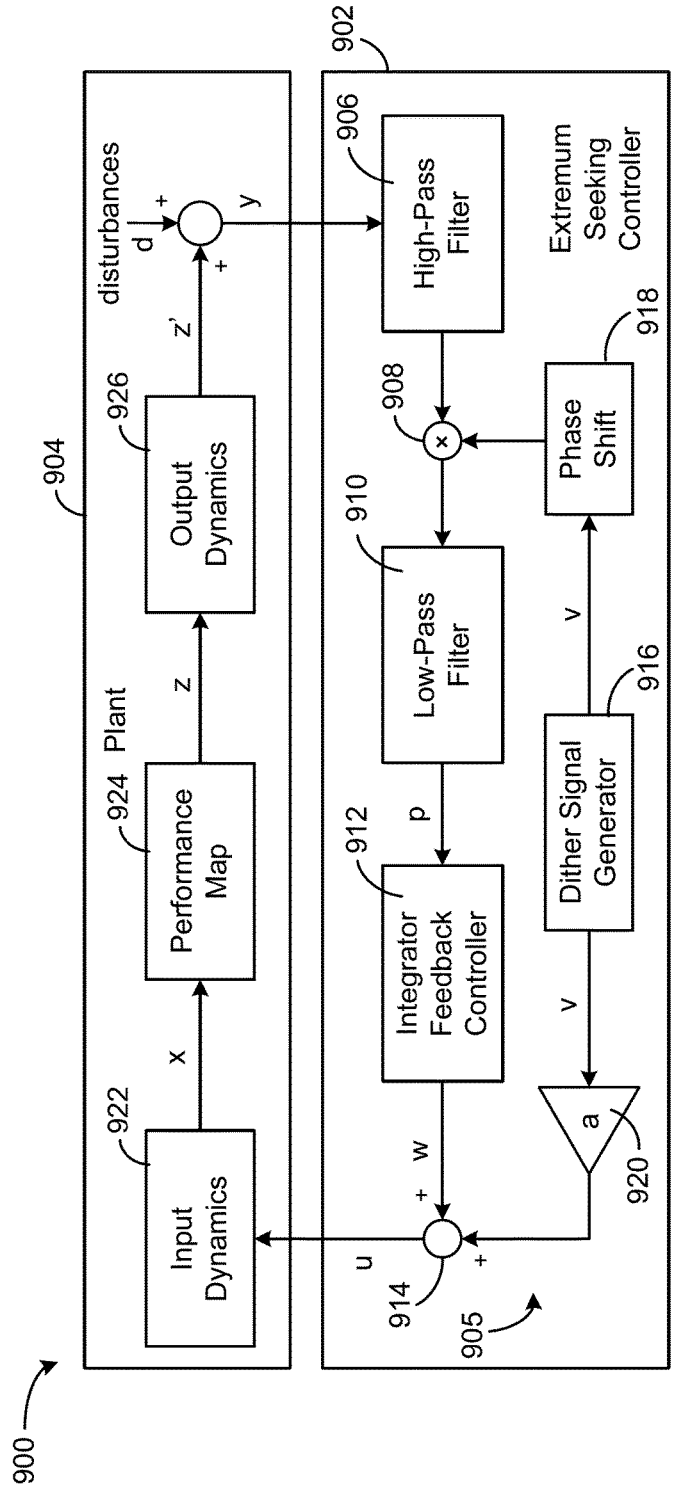
FIG. 9 is a block diagram of an extremum seeking control technique which can be used by the hybrid control system of FIG. 6, according to some embodiments.

Referring now to FIG. 9, a block diagram of another closed loop control model 900 is shown, according to an exemplary embodiment. Model 900 illustrates an extremum seeking control technique which can be used by one or more of state controllers 620. Model 900 is shown to include an extremum-seeking controller 902 and a plant 904. A plant in control theory is the combination of a process and one or more mechanically-controlled outputs. For example, plant 904 can be an air handling unit configured to control temperature within a building space via one or more mechanically-controlled actuators and/or dampers. In various embodiments, plant 904 can include a chiller operation process, a damper adjustment process, a mechanical cooling process, a ventilation process, a refrigeration process, or any other process in which an input variable to plant 904 (i.e., manipulated variable u) is adjusted to affect an output from plant 904 (i.e., performance variable y). Controller 902 uses an extremum-seeking control strategy to optimize performance variable y received as an output from plant 904. Optimizing performance variable y can include minimizing y, maximizing y, controlling y to achieve a setpoint, or otherwise regulating the value of performance variable y.

Plant 904 can be represented mathematically as a combination of input dynamics 922, a performance map 924, output dynamics 926, and disturbances d. In some embodiments, input dynamics 922 are linear time-invariant (LTI) input dynamics and output dynamics 926 are LTI output dynamics. Performance map 924 can be a static nonlinear performance map. Disturbances d can include process noise, measurement noise, or a combination of both. Although the components of plant 904 are shown in FIG. 9, it should be noted that the actual mathematical model for plant 904 does not need to be known in order to apply ESC.

Plant 904 receives a control input u (e.g., a control signal, a manipulated variable, etc.) from extremum-seeking controller 902. Input dynamics 922 may use the control input u to generate a function signal x based on the control input (e.g., $x=f(u)$). Function signal x may be passed to performance map 924 which generates an output signal z as a function of the function signal (i.e., $z=f(x)$). The output signal z may be passed through output dynamics 926 to produce signal z', which is modified by disturbances d to produce performance variable y (e.g., $y=z'+d$). Performance variable y is provided as an output from plant 904 and received at extremum-seeking controller 902. Extremum-seeking controller 902 may seek to find values for x and/or u that optimize the output z of performance map 924 and/or the performance variable y.

Still referring to FIG. 9, extremum-seeking controller 902 is shown receiving performance variable y and providing performance variable y to a control loop 905 within controller 902. Control loop 905 is shown to include a high-pass filter 906, a demodulation element 408, a low-pass filter 410, an integrator feedback controller 912, and a dither signal generator 916. Control loop 905 may be configured to extract a performance gradient p from performance variable y using a dither-demodulation technique. Integrator feedback controller 912 analyzes the performance gradient p and adjusts the DC value of the plant input (i.e., the variable w) to drive performance gradient p to zero.

The first step of the dither-demodulation technique is performed by dither signal generator 916 and dither signal element 914. Dither signal generator 916 generates a periodic dither signal v, which is typically a sinusoidal signal. In some embodiments, an amplifier 920 amplifies dither signal v. It may be desirable to amplify the dither signal v such that the amplitude of the dither signal v is large enough for the effects of dither signal v to be evident in the plant output y. Dither signal element 914 receives the (amplified) dither signal v from dither signal generator 916 and the DC value of the plant input w from controller 912. Dither signal element 914 combines dither signal v with the DC value of the plant input w to generate the perturbed control input u provided to plant 404 (e.g., u=w+v). The perturbed control input u is provided to plant 904 and used by plant 904 to generate performance variable y as previously described.

The second step of the dither-demodulation technique is performed by high-pass filter 906, demodulation element 908, and low-pass filter 910. High-pass filter 906 filters the performance variable y and provides the filtered output to demodulation element 908. Demodulation element 908 demodulates the output of high-pass filter 906 by multiplying the filtered output by the dither signal v with a phase shift 918 applied. The DC value of this multiplication is proportional to the performance gradient p of performance variable y with respect to the control input u. The output of demodulation element 908 is provided to low-pass filter 910, which extracts the performance gradient p (i.e., the DC value of the demodulated output). The estimate of the performance gradient p is then provided to integrator feedback controller 912, which drives the performance gradient estimate p to zero by adjusting the DC value w of the plant input u.

Building Control System with Adaptive User Interface

Some hybrid control systems operate in a manner that is easily understandable by a user. For example, a human operator observing the behavior of hybrid control system 600 can easily understand what system 600 is doing in each of the operating states 702-706 and why system 600 is operating in the current operating state due to the relatively small number of operating states 702-706 and state transition conditions 708-714. However, it can be difficult for a user to understand the behavior of more complex systems with a greater number of operating states, especially when the state transition conditions are non-intuitive and the closed loop control techniques within the operating states are complicated. An example of such a complex system is shown in FIG. 10.

Figure 10:
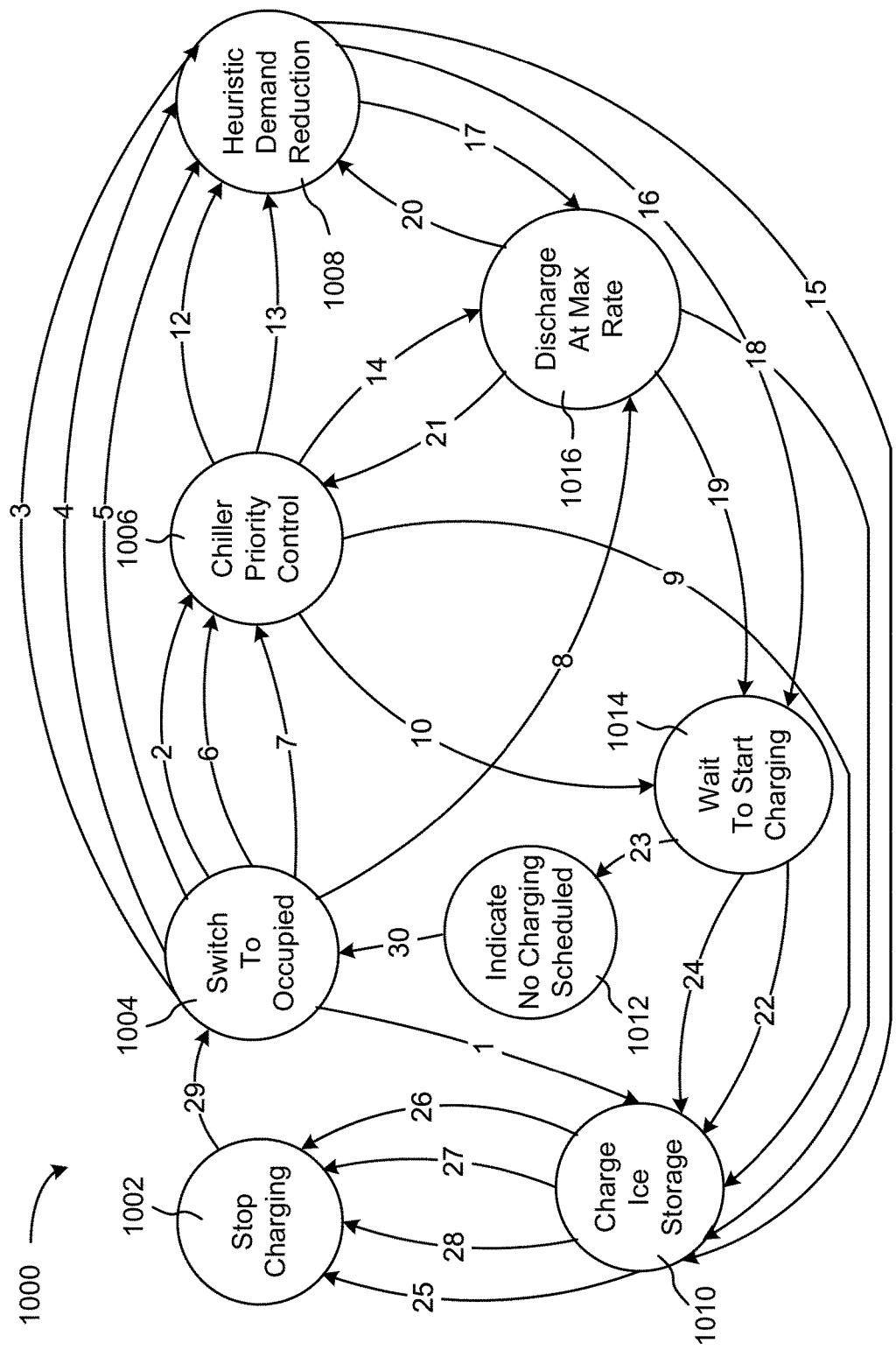
FIG. 10 is a state transition diagram for an ice storage controller with many operating states and state transitions, according to some embodiments.

Referring now to FIG. 10, a state transition diagram 1000 of another hybrid control system is shown, according to an exemplary embodiment. Diagram 1000 is an example of a state transition diagram for an ice storage controller with many different operating states 1002-1016 (i.e., stop charging state 1002, switch to occupied state 1004, chiller priority control state 1006, heuristic demand reduction state 1008, charge ice storage state 1010, indicate no charging scheduled state 1012, wait to start charging state 1014, and discharge at max rate state 1016) and a large number of state transition conditions 1-30. Many of the state transition conditions 1-30 require the control system to evaluate multiple factors to determine whether the condition is satisfied. System operation within each operating state 1002-1016 can also be complicated.

Using conventional interfaces, it can be difficult for a user to understand what the control system is doing and why. For example, the information presented to the user often does not clearly indicate what the control system is doing in each of the operating states and/or why the control system is operating in the current operating state. As a result, some automatic control systems are often manually overridden or disabled because the human operator does not understand whether the system is operating properly. Such manual overrides can reduce system performance and lead to suboptimal operation. One way to address this problem is to provide an adaptive user interface through which the control system communicates expected behaviors and explains system operation in a user-friendly manner.

Figure 11:
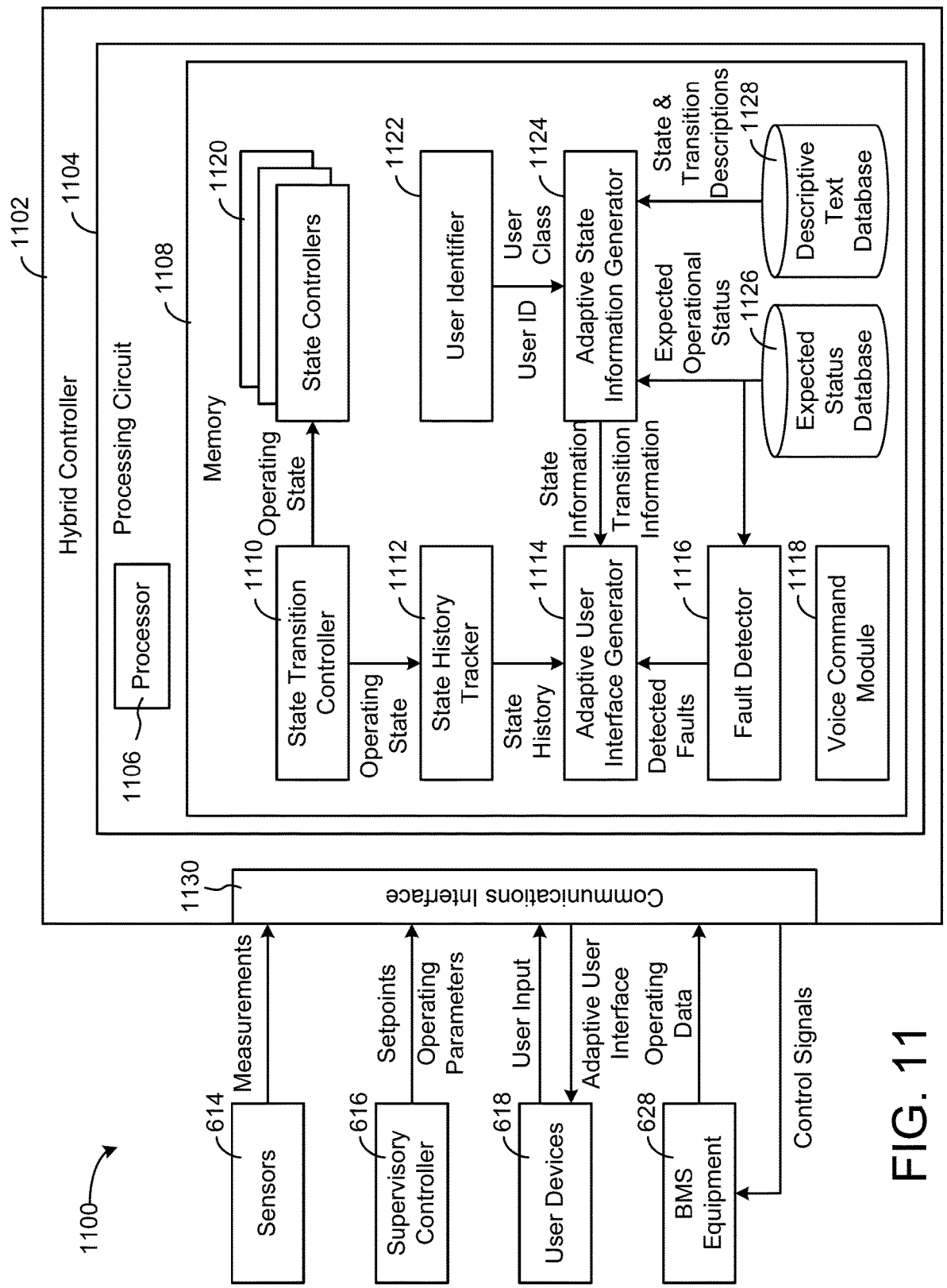
FIG. 11 is a block diagram of another hybrid control system which can be used to monitor and control the building of FIG. 1, according to some embodiments.

Referring now to FIG. 11, a building control system 1100 with an adaptive user interface is shown, according to an exemplary embodiment. System 1100 is shown to include many of the same components as system 600. For example, system 1100 is shown to include sensors 614, supervisory controller 616, user devices 618, and BMS equipment 628. These components may be the same as described with reference to FIG. 6. System 1100 is further shown to include a hybrid controller 1102. Hybrid controller 1102 can operate as a finite state machine to evaluate state transition conditions and transition between multiple operating states. Hybrid controller 1102 can also operate as a closed loop controller within each of the operating states.

Hybrid controller 1102 can generate and provide an adaptive user interface which presents information in a user friendly way. Advantageously, the user interface can be customized by hybrid controller 1102 to tailor the presented information to a particular user or user class. For example, hybrid controller 1102 can identify the current user (e.g., via login credentials, facial recognition, voice recognition, etc.) and generate a user interface which presents set of information customized to the identified user. In various embodiments, the adaptive user interface can be customized to individual users and/or customized to various classes of users who can interact with hybrid controller 1102 (e.g., service technicians, operations staff, building occupant, etc.).

The adaptive user interface can present information about the current operating state of 1102, a history of state transitions or previous operating states, the expected behaviors of system 1100 in the current operating state, and/or other information which may be relevant to a particular user or user class. Hybrid controller 1102 can generate descriptive text, charts, graphs, or other interface elements which may be most useful to a particular user or user class. For example, if the user is identified as a member of the user class "operations staff," hybrid controller 1102 can generate a user interface which includes descriptive text customized to operations staff members to help explain the expected behavior of system 1100 in the current operating state.

Hybrid controller 1102 can customize the adaptive user interface to present information with an appropriate level of detail for the user and in a format that is most understandable by the user. For example, service technicians can be provided with detailed diagnostic information and in-depth descriptions of system operation which may be useful when servicing BMS equipment 628, whereas building owners can be provided with more general information customized to be readily understandable by individuals without extensive knowledge of building automation systems or building controls. In some embodiments, hybrid controller 1102 presents information in a format which best suits the user's individual learning style. For example, hybrid controller 1102 can present information in visual format (e.g., charts, graphs, tables, etc.) to users who are identified as visual learners, whereas hybrid controller 1102 can present information in an audio format (e.g., using a text-to-speech module or voice command module) to users who are identified as auditory learners. These and other features of hybrid controller 1102 are described in greater detail below.

Hybrid controller 1102 is shown to include a communications interface 1130. Communications interface 1130 can include wired or wireless interfaces (e.g., jacks, antennas, transmitters, receivers, transceivers, wire terminals, etc.) for conducting data communications with various systems, devices, or networks. For example, communications interface 1130 can include an Ethernet card and port for sending and receiving data via an Ethernet-based communications network and/or a WiFi transceiver for communicating via a wireless communications network. Communications interface 1130 can be configured to communicate via local area networks or wide area networks (e.g., the Internet, a building WAN, etc.) and may use a variety of communications protocols (e.g., BACnet, IP, LON, etc.).

Communications interface 1130 can be a network interface configured to facilitate electronic data communications between controller 1102 and various external systems or devices (e.g., sensors 614, supervisory controller 616, user devices 618, BMS equipment 628, etc.). For example, hybrid controller 1102 can receive measurements from sensors 614 via communications interface 1130. In some embodiments, sensors 614 provide a feedback signal to hybrid controller 1102 indicating the value of a variable of interest in the controlled system (e.g., building zone temperature, building zone humidity, system power consumption, etc.). Similarly, hybrid controller 1102 can receive setpoints, operating parameters (e.g., controller tuning parameters, system models, threshold values, etc.), and other types of data inputs from supervisory controller 616 via communications interface 1130. Hybrid controller 1102 can also receive operating data from BMS equipment 628 via communications interface 1130.

Hybrid controller 1102 can use the measurements from sensors 614, the setpoints and operating parameters from supervisory controller 616, and the operating data from BMS equipment 628 to evaluate state transition conditions and/or to perform closed loop control operations within various operating states. Hybrid controller 1102 can provide BMS equipment 628 with control signals via communications interface 1130. In some embodiments, BMS equipment 628 operate according to the control signals to affect one or more of the variables measured by sensors 614. For example, BMS equipment 628 can use the control signals to activate or deactivate a chiller, open or close a damper, adjust the speed of a fan, or otherwise operate BMS equipment 628 to affect a variable controlled by hybrid controller 1102.

Hybrid controller 1102 can interact with user devices 618 via communications interface 1130. For example, user devices 618 can provide hybrid controller 1102 with user input such as setpoints, operating parameters, manual values for measured variables, operating commands, manual state transition commands, and/or other types of user input. Hybrid controller 1102 can use the input from user devices 618 to evaluate state transition conditions and/or to perform closed loop control operations within various operating states. In some embodiments, hybrid controller 1102 provides user devices 618 with an adaptive user interface. The adaptive user interface can be customized to a particular user or user class to provide information in a manner that is easily understandable to the user or user class. The adaptive user interface is described in greater detail below.

Still referring to FIG. 11, hybrid controller 1102 is shown to include a processing circuit 1104 having a processor 1106 and memory 1108. Processor 1106 can be a general purpose or specific purpose processor, an application specific integrated circuit (ASIC), one or more field programmable gate arrays (FPGAs), a group of processing components, or other suitable processing components. Processor 1106 can be configured to execute computer code or instructions stored in memory 1108 or received from other computer readable media (e.g., CDROM, network storage, a remote server, etc.).

Memory 1108 can include one or more devices (e.g., memory units, memory devices, storage devices, etc.) for storing data and/or computer code for completing and/or facilitating the various processes described in the present disclosure. Memory 1108 can include random access memory (RAM), read-only memory (ROM), hard drive storage, temporary storage, non-volatile memory, flash memory, optical memory, or any other suitable memory for storing software objects and/or computer instructions. Memory 1108 can include database components, object code components, script components, or any other type of information structure for supporting the various activities and information structures described in the present disclosure. Memory 1108 can be communicably connected to processor 1106 via processing circuit 1104 and can include computer code for executing (e.g., by processor 1106) one or more processes described herein.

Hybrid controller 1102 is shown to include a state transition controller 1110 and a plurality of state controllers 1120. State transition controller 1110 can operate as a finite state machine to evaluate state transition conditions and transition between various operating states. The state transition conditions and the logic used by state transition controller 1110 can be stored in a database for later retrieval. In some embodiments, state transition controller 1110 provides an indication of the current operating state to state controllers 1120.

Each of state controllers 1120 can operate as a closed loop controller within a particular operating state. In some embodiments, each state controller 1120 becomes active when state transition controller 1110 transitions into the corresponding operating state and inactive when state transition controller 1110 transitions out of the corresponding operating state. In some embodiments, each of state controllers 1120 uses a different control algorithm and/or different control logic. This allows hybrid controller 1102 to function as multiple different controllers, each of which controls the operation of system 1100 in a particular operating state.

Hybrid controller 1102 can decompose a complicated system into a multiplicity of smaller systems or operating states with clearly-defined interactions between states (i.e., the interactions defined by the state transition conditions). In some embodiments, hybrid controller 1102 uses one or more model-based design (MBD) methodologies to exploit advantages of this decomposition. The advantages of MBD are numerous including, for example, shorter development times more robust operation due to logic simplification, automatic code generation, availability of a common design environment, and easy reuse of test cases.

Hybrid controller 1102 can use any of a variety of MBD tools (e.g., Mathworks) to model the discrete state transition logic and system operation in each of the operating states. For example, hybrid controller 1102 can use the "State Flow" toolbox of Mathworks to model the discrete state transition logic. Hybrid controller 1102 can use the "Simulink" toolbox of Mathworks to model the closed loop control logic within each operating state. Several examples of such models are described in detail with reference to FIGS. 7-10.

Still referring to FIG. 11, hybrid controller 1102 is shown to include a state history tracker 1112. State history tracker 1112 is shown receiving an indication of the current operating state from state transition controller 1110. State history tracker 1112 can monitor the current operating state over time and can record a history of state transitions and/or operating states. In some embodiments, state history tracker 1112 records a time at which each state transition occurs along with an identity of the origin state (i.e., the current operating state immediately prior to the state transition) and the destination state (i.e., the current operating state immediately following the state transition). State history tracker 1112 can use such information to generate statistics relating to the state transitions and/or the operating states. For example, state history tracker 1112 can determine an amount of time spent in a given operating state by subtracting the time at which state transition controller 1110 transitions into the operating state from the time at which state transition controller 1110 transitions out of the operating state.

In some embodiments, state history tracker 1112 records the state transition condition or conditions which trigger each state transition. For example, state transition controller 1110 can operate according to state transition logic which causes state transition controller 1110 transition from State A to State B if any one of several alternative state transition conditions are satisfied (e.g., "temperature below setpoint" OR "time in state exceeds threshold"). State history tracker 1112 can identify the particular transition condition which was satisfied to trigger the state transition and can store an indication of the satisfied state transition condition along with the time at which the state transition occurred. State history tracker 1112 can determine the most common transitions into each operating state and out of each operating state by analyzing a history of state transitions over time. State history tracker 1112 can also identify the most common state transition conditions or triggers for each state transition.

In some embodiments, state history tracker 1112 generates a state history and provides the state history to adaptive user interface generator 1114. In some embodiments, the state history includes a time series of state values which can be used to reconstruct the sequence of operating states over a period of time. Each element of the time series (e.g., each operating state) can include a plurality of attributes characterizing the element. For example, each operating state in the time series can include attributes defining the identity of the operating state (i.e., the state value), the time at which controller 1110 transitions into the operating state, the state transition condition which was satisfied to trigger the transition into the operating state, the origin state from which controller 1110 transitioned into the operating state, the time at which controller 1110 transitions out of the operating state, the state transition condition which was satisfied to trigger the transition out of the operating state, the destination state into which controller 1110 transitioned from the operating state, a time spent in the operating state, and/or other attributes characterizing the operating state in the time series.

In some embodiments, the state history includes a time series of state transitions which can be used to reconstruct the sequence of operating states over a period of time. Each element of the time series (e.g., each state transition) can include a plurality of attributes characterizing the element. For example, each state transition in the time series can include attributes defining the identity of the state transition (e.g., by an alphanumeric identifier), the time at which the state transition occurs, the origin state immediately preceding the state transition, the destination state immediately following the state transition, the particular transition condition which triggered the state transition, the time spent in the previous operating state, the previous state transition, and/or other attributes characterizing the state transition in the time series. State history tracker 1112 can provide the state history to adaptive user interface generator 1114 for use in generating the adaptive user interface.

Still referring to FIG. 11, hybrid controller 1102 is shown to include a user identifier 1122. User identifier 1122 can be configured to identify a particular user or user class interacting with hybrid controller 1102 via the adaptive user interface. In some embodiments, user identifier 1122 identifies the user based on login credentials provided by the user (e.g., a user name, a user ID, etc.). In some embodiments, user identifier 1122 identifies the user by examining biometric markers provided by the user. For example, user identifier 1122 can use a camera (e.g., a device of BMS equipment 628) to capture an image of the user and can identify the user based on the image. User identifier 1122 can use a fingerprint, a voice print, or other biometric marker to uniquely identify the user from a set of users for which biometric markers have been stored.

User identifier 1122 can determine a user class or group associated with the identified user. In some embodiments, user identifier 1122 accesses a user database which indicates one or more user groups or classes to which the identified user belongs. For example, user identifier 1122 can identify the user as a member of the "operations staff" class or the "service technicians" class based on information from the user database. In some embodiments, user identifier 1122 identifies various attributes of the user or user class. For example, user identifier 1122 can identify the user's preferred learning style (e.g., visual, auditory, tactile, etc.) by accessing a user profile associated with the user. In some embodiments, user identifier 1122 identifies a level of technical understanding or experience associated with the user or user class (e.g., inexperienced, veteran, expert, etc.).

In some embodiments, user identifier 1122 identifies attributes of the user by retrieving information from a database. User identifier 1122 can learn the behavior and/or preferences of the user over time (e.g., based on user feedback or input) and can update the database to reflect the learned attributes of the user. For example, user identifier 1122 can present the user with a prompt to specify user attributes and preferences such as the user's preferred learning style, the user's technical experience, the level of detail the user wants to see, etc. User identifier 1122 can use feedback from the user to populate one or more attributes of a user profile stored in the database.

In some embodiments, user identifier 1122 automatically learns the user's behavior and preferences without requiring the user to specify such information. For example, user identifier 1122 can analyze actions that have been taken by the user (e.g., manual override decisions) or input provided by the user (e.g., requests for a different type of information) in response to various sets of information presented via the adaptive user interface. User identifier 1122 can use the feedback from the user to automatically determine the user's preferences and level of technical understanding or expertise. For example, if the user repeatedly overrides automatic control decisions with suboptimal manual settings when presented with a set of information tailored to expert users, user identifier 1122 can determine that the user does not understand the expert information and should be presented with a set of information tailored to less experienced users. Similarly, if the user repeatedly requests more details or more complex information when presented with a set of information tailored to novice users, user identifier 1122 can determine that the user should be presented with a set information tailored to more experienced users. User identifier 1122 can use the learned behaviors and/or preferences of the user to automatically update the attributes of the user profile stored in the database.

Still referring to FIG. 11, hybrid controller 1102 is shown to include an adaptive state information generator 1124. Adaptive state information generator 1124 can generate a set of information for presentation to a user via the adaptive user interface. The information generated by adaptive state generator 1124 is shown to include state information and transition information. State information can include descriptions and/or explanations of the current operating state, a past operating state (e.g., a past state specified by the state history), a future operating state (e.g., a predicted operating state), or other potential operating states specified by the state transition diagram or state transition logic. In some embodiments, the state information includes an expected operational status (e.g., expected values of variables, expected equipment status, etc.) for each operating state. Transition information can include descriptions and/or explanations of various state transitions (e.g., past transitions specified by the state history, future predicted state transitions, etc.) or other potential state transitions specified by the state transition diagram or state transition logic.

Adaptive state information generator 1124 is shown receiving state and transition descriptions from a descriptive text database 1128. Descriptive text database 1128 can include multiple different descriptions (e.g., snippets of descriptive text) for each operating state and for each state transition. Each description can be tailored to communicate effectively with a different type of user or user class (e.g., building owners, novice users, operations staff, service technicians, expert users, etc.) based on the attributes and abilities of the user or user class. For example, descriptive text database 1128 can include a general description of each operating state and state transition for novice users, and a more detailed technical description of each operating state and state transition for expert users.

In some embodiments, the descriptive text from descriptive text database 1128 is displayed along with the state transition diagram in the adaptive user interface. The descriptive text for an operating state can be displayed in response to a user clicking on the operating state in the state transition diagram and/or in response to state transition controller 1110 transitioning into the operating state. Similarly, the descriptive text for a state transition can be displayed in response to a user clicking on the state transition in the state transition diagram and/or in response to the state transition occurring. In some embodiments, the current operating state and/or most recent state transition is highlighted in the state transition diagram shown in the adaptive user interface.

Advantageously, adaptive state information generator 1124 can customize the state information and the transition information presented in the adaptive user interface to the particular user or user class to which the information will be presented. In some embodiments, adaptive state information generator 1124 selects a particular set of state descriptions and transition descriptions from descriptive text database 1128 based on the identity of the user or user class to which the descriptions will be presented. For example, the following text can be displayed to a user belonging to the "operations staff" class along with state transition diagram 1000 in response to the user clicking on the "Chiller Priority Control" operating state 1006 in the adaptive user interface:

The optimizing controls are currently in chiller priority mode where the chillers will take as much of the building load as possible and the cooling thermal storage will only be discharged if the building load exceeds the sum of the chiller capacities. In this mode the thermal storage system should never be in a charging mode.

Similarly, the following text can be displayed to a user belonging to the "novice user" class along with state transition diagram 1000 in response to the user clicking on the "Chiller Priority Control" operating state 1006 in the adaptive user interface:

The system is currently in chiller priority mode. The system will try to cool the building using only the chillers, but will also discharge the cooling thermal storage if additional cooling is needed. The thermal storage system should not be charging in this mode.

The text associated with the novice user class conveys the same general information as the text associated with the operations staff class since both text snippets describe the same operating state. However, the text for the novice user class omits some of the more technical terminology (e.g., optimizing controls, building load, chiller capacities, etc.) in favor of language that is more understandable by a novice user.

In some embodiments, adaptive state generator 1124 receives an expected operational status (i.e., expected status information) for one or more of the operating states from expected status database 1126. An expected operational status can include expected values for various data points associated with the operating state. Such data points can include, for example, monitored variables, calculated variables, system parameters, feedback loop status indicators, equipment status indicators, or other data points associated with the operating state. The expected operational status can be presented to a user via the adaptive user interface. In some embodiments, the expected operational status includes a set of instructions for a user (e.g., actions to perform) when the expected values differ from the actual values of the corresponding data point. Like the state and transition descriptions, the set of instructions can be tailored to the particular user or user class to which the expected operational status will be presented.

In some embodiments, adaptive state information generator 1124 retrieves the expected operational status for an operating state in response to a request for information about the operating state received via the adaptive user interface. For example, adaptive state information generator 1124 can retrieve the expected operational status for an operating state in response to a user selecting (e.g., clicking on) the operating state in a state transition diagram presented via the adaptive user interface. In some embodiments, adaptive state information generator 1124 retrieves the expected operational status for an operating states automatically (e.g., in response to transitioning into the operating state) without requiring user input.

Adaptive state information generator 1124 can customize the expected operational status presented in the adaptive user interface to the particular user or user class to which the expected operational status will be presented. Expected status database 1126 can include multiple sets of expected status information for each operating state. Each set of expected status information can be tailored to communicate effectively with a different type of user or user class (e.g., building owners, novice users, operations staff, service technicians, expert users, etc.) based on the attributes and abilities of the user or user class. For example, expected status database 1126 can include a less detailed expected operational status for each operating state for novice users, and a more detailed expected operational status for each operating state for expert users. Adaptive state information generator 1124 can select and retrieve a particular expected operational status from expected status database 1126 based on the identity of the user or user class to which the expected operational status will be presented.

Adaptive state information generator 1124 can generate a user interface element containing the expected values defined by the expected operational status for each operating state. The user interface element can include, for example, a data table, chart, graph, or other representation of the expected values for a particular operating state. The user interface element can also include the actual values of each data point for which an expected value is provided. The actual values can be received as measurements from sensors 614, input from supervisory controller 616 or user devices 618, operating data from BMS equipment 628, generated by hybrid controller 1102, or received from any other data source.

The data table shown below is one example of a user interface element which can be generated by adaptive state information generator 1124. The data table includes an indication of various point names associated with a particular operating state, expected values of the data points, actual values of the data points, and actions to be performed when the actual values differ from the expected values. The actions can be presented in the form of instructions for a user. In some embodiments, the instructions are tailored to the user or user class to which the data table is presented.

| Point Name | Expected Value | Actual Value | Action |
|---|---|---|---|
| Chiller Plant Availability Enum | avail | avail | none |
| Cooling TES Availability Enum | avail | avail | none |
| Cooling TES Capacity Command | 0% | 0% | none |
| Cooling TES Flow Rate | 0 gpm | 2000 gpm | 1. Override valve # 8 to 0%<br>2. Call Bob at 262-123-4567<br>3. Inspect valve & actuator |

In some embodiments, a portion of the data table can be highlighted or otherwise emphasized to distinctly indicate differences between expected and actual values. For example, the bottom row of the data table shows a difference between the expected value of "0 gpm" for the cooling thermal energy storage (TES) flow rate and the actual value of "2000 gpm" for the cooling TES flow rate. Adaptive state information generator 1124 can modify the bottom row by changing the color of the text (e.g., displaying the bottom row in red text), changing a background color of the bottom row, flashing the text of the bottom row, or otherwise presenting the text of the bottom row in a manner that draws attention to the difference between the expected and actual value.

In some embodiments, hybrid controller 1102 includes a fault detector 1116. Fault detector 1116 can be configured to automatically detect faults in system 1100. In some embodiments, fault detector 1116 performs on-going fault detection for BMS equipment 628, hybrid controller 1102, and control algorithms used by state transition controller 1110 and/or state controllers 1120. Fault detector 1116 can receive data inputs from sensors 614, supervisory controller 616, user devices 618, BMS equipment 628, from other components of hybrid controller 1102, or from another data source. Fault detector 1116 can automatically diagnose and respond to detected faults. The responses to detected or diagnosed faults can include providing an alert message to a user, a maintenance scheduling system, or a control algorithm configured to attempt to repair the fault or to work-around the fault.

Fault detector 1116 can be configured to output a specific identification of the faulty component or cause of the fault (e.g., loose damper linkage) using detailed subsystem inputs available at hybrid controller 1102. For example, fault detector 1116 can provide fault indications to adaptive user interface generator 1114 which presents the fault indications to a user via the adaptive user interface. In other embodiments, fault detector 1116 is configured to provide fault indications to supervisory controller 616 which executes control strategies and policies in response to the received fault events. In some embodiments, fault detector 1116 can shut-down systems or direct control activities around faulty devices or systems to reduce energy waste, extend equipment life, or assure proper control response.

Fault detector 1116 can be configured to store or access a variety of different system data stores (or data points for live data). Fault detector 1116 can use some content of the data stores to identify faults at the equipment level (e.g., specific chiller, specific AHU, specific terminal unit, etc.) and other content to identify faults at component or subsystem levels. For example, sensors 614 and BMS equipment 628 can generate temporal (i.e., time-series) data indicating the performance of system 1100 and the various components thereof. The data generated by sensors 614 and BMS equipment 628 can include measured or calculated values that exhibit statistical characteristics and provide information about how the corresponding system or process (e.g., a temperature control process, a flow control process, etc.) is performing in terms of error from its setpoint. These processes can be examined by fault detector 1116 to expose when system 1100 begins to degrade in performance and alert a user to repair the fault before it becomes more severe.

Still referring to FIG. 11, hybrid controller 1102 is shown to include an adaptive user interface generator 1114. Adaptive user interface generator 1114 is shown receiving the state history from state history tracker 1112, the state information and transition information from adaptive state information generator 1124, and the detected faults from fault detector 1116. Adaptive user interface generator 1114 can use the received information to generate an adaptive user interface. In some embodiments, the adaptive user interface is presented via a user interface device of hybrid controller 1102 (e.g., an electronic display, speakers, etc.). In other embodiments, the adaptive user interface can be sent to user devices 618 via communications interface 1130 and presented to a user via a user interface element of user devices 618.

In some embodiments, the adaptive user interface includes the state transition diagram of the controlled system (e.g., state transition diagram 700 or 1000) or an abstraction of the state transition diagram. The current operating state can be highlighted in the state transition diagram along with the transition condition that caused the transition into the current operating state. Adaptive user interface generator 1114 can update the state transition diagram in real-time (e.g., in response to a state transition) to reflect changes to the current operating state. For example, adaptive user interface generator 1114 can automatically move the highlighting from the previous operating state to the current operating state and from the previous state transition to the most recent state transition in response to a state transition occurring. In some embodiments, the adaptive user interface indicates a time at which the highlighted state transition occurred and/or an amount of time the system has been operating in the highlighted operating state.

In some embodiments, the adaptive user interface includes the state information and the transition information provided by adaptive state information generator 1124. Both the state information and the transition information can be updated dynamically in response to user input received via the adaptive user interface. For example, a user can click on a particular operating state in the adaptive user interface to display the state information associated with that operating state. Similarly, the user can click on a particular state transition in the adaptive user interface to display the transition information associated with that state transition. As described above, both the state information and transition information can be customized to the particular user or user class to which the adaptive user interface is presented.

In some embodiments, the adaptive user interface includes a user interface element containing the expected values defined by the expected operational status for a particular operating state (e.g., the current operating state, a user-selected operating state, etc.). The user interface element can include, for example, a data table, chart, graph, or other representation of the expected values for the operating state. The user interface element can also include the actual values of each data point for which an expected value is provided. Advantageously, the user interface element can convey both the expected values and the actual values of the data points to allow a user to readily determine whether the system is operating as expected.

In some embodiments, the adaptive user interface allows a user to view the state history provided by state history tracker 1112. For example, the adaptive user interface can include state history controls (e.g., a previous state button, a next state button, a current state button, etc.) which allow a user to view past operating states and past state transitions leading to the current operating state. The user can operate the state history controls to view each state and state transition in the state history, along with the state information and transition information associated therewith. These and other features of the adaptive user interface are described in greater detail with reference to FIG. 12.

Still referring to FIG. 11, hybrid controller 1102 is shown to include a voice command module 1118. Voice command module 1118 can use verbal communication to receive input from a user and provide information to the user. In some embodiments, voice command module 1118 presents some or all of the information contained in the adaptive user interface in an audio format. For example, voice command module 1118 can generate verbal messages indicating the current operating state, the most recent state transition, the state and transition information, and/or the expected operational status. In some embodiments, voice command module 1118 is used to interact with the user in response to a determination that verbal communication is most effective for the identified user or user class (e.g., based on user attributes provided by user identifier 1122).

Voice command module 1118 can receive and interpret verbal input from the user. For example, voice command module 1118 can receive voice commands from the user requesting information about the current operating state. Voice command module 1118 can use the verbal input from the user to generate a query for one or more components of hybrid controller 1102. Voice command module 1118 can query state transition controller 1110 to identify the current operating state. Voice command module 1118 can query the state history provided by state history tracker 1112 to identify one or more previous operating states and/or state transitions leading to the current operating state. Voice command module 1118 can query expected status database 1126 and descriptive text database 1128 to obtain an expected operational status, state descriptions, and/or transition descriptions for one or more operating states. In some embodiments, voice command module 1118 identifies the user or user class provided by user identifier 1122 and retrieves a particular operational status, state description, or transition description customized to the identified user or user class.

Voice command module 1118 can respond to voice commands by providing audio output for the user. The audio output can provide information about the current operating state, past operating states, past state transitions, or other information responsive to the voice command. For example, the user can communicate with voice command module 1118 by providing the voice command "What is the current operating state?" In response to this voice command, voice command module 1118 can identify the current operating state and can generate an audio output explaining the current operating state (e.g., by reading the customized state description associated with the current operating state). As another example, the user can provide the voice command "Why are we in that state?" In response to this voice command, voice command module 1118 can identify the state transition which triggered the transition into the current operating state and can generate an audio output explaining the reasons for the state transition (e.g., by reading the customized transition description associated with the state transition).

Advantageously, voice command module 1118 further enhances the primary function of the adaptive user interface, which is to present information to a user in a form that is easily understandable by the user and customized to the user's individual learning style. By enabling verbal communications, voice command module 1118 improves the ability of hybrid controller 1102 to communicate with auditory learners. In some embodiments, voice command module 1118 is used to communicate with auditory learners, whereas the visual user interface provided by adaptive user interface generator 1114 is used to communicate with visual learners. This form of adaptation to user preferences and learning styles extends beyond merely customizing the information presented to the user; by providing the option to present information visually or verbally, hybrid controller 1102 can adapt the manner in which the information is presented to accommodate a variety of different learning styles.

Adaptive User Interface

Figure 12:
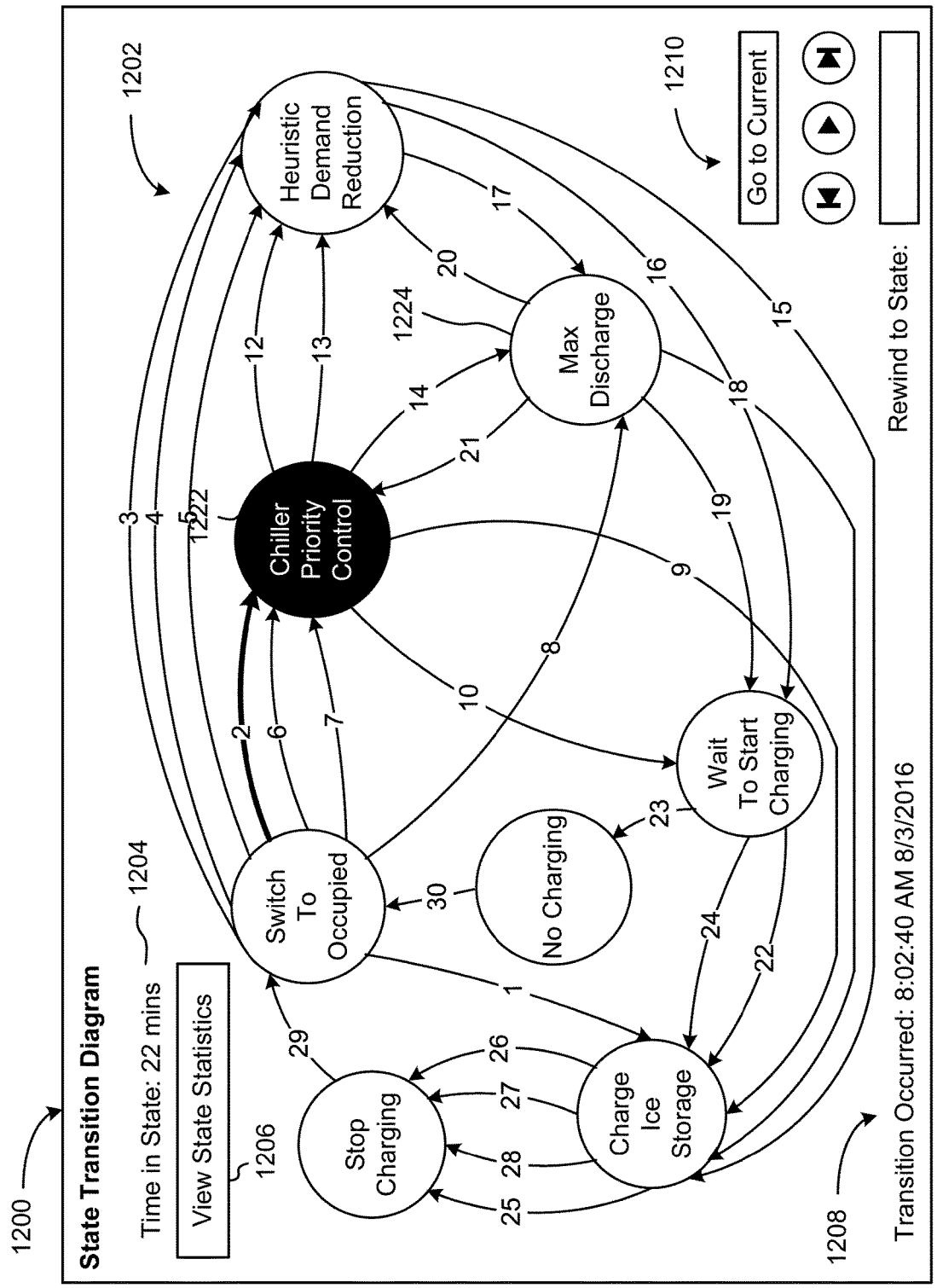
FIG. 12 is a drawing of an adaptive user interface which can be generated by the hybrid controller of FIG. 11, according to some embodiments.

Referring now to FIG. 12, a drawing of an adaptive user interface 1200 is shown, according to an exemplary embodiment. Adaptive user interface 1200 can be generated by adaptive user interface generator 1114, as described with reference to FIG. 11. Adaptive user interface 1200 is shown to include a state transition diagram 1202. The current operating state 1222 (i.e., "Chiller Priority Control") can be highlighted in state transition diagram 1202 along with the transition condition 2 that caused the transition into the current operating state 1222. In some embodiments, state transition diagram 1202 is updated in real-time (e.g., in response to a state transition) to reflect changes to the current operating state. For example, if a state transition occurs from operating state 1222 to operating state 1224 (i.e., "Max Discharge") via state transition 14, the highlighting can move from operating state 1222 to operating state 1224 and from state transition 2 to state transition 14.

In some embodiments, adaptive user interface 1200 indicates a time 1208 at which the highlighted state transition occurred (i.e., "8:02:40 AM Aug. 3, 2016"). Time 1208 can be automatically updated each time a state transition occurs. Adaptive user interface 1200 can also indicate an amount of time 1204 the system has been operating in the highlighted operating state. If the state being displayed is the current operating state, the amount of time 1204 may indicate the time elapsed since the most recent state transition occurred. The amount of time 1204 can be dynamically updated as the system remains in the current operating state. However, if the state being displayed is a past operating state (described in greater detail below), the amount of time 1204 may indicate the time spent in the past operating state (i.e., the difference between the time at which the system transitioned out of the past operating state and the time at which the system transitioned into the past operating state).

In some embodiments, adaptive user interface 1200 includes user-operable state history controls 1210. State history controls 1210 allow a user to view the state history provided by state history tracker 1112. The user can operate state history controls 1210 to view each state and state transition in the state history, along with the state description 1212, transition description 1214, and operational status 1216 associated therewith. For example, state history controls 1210 are shown to include a current state button, a previous state button, a play button, and a next state button. The user can select the previous state button to cause adaptive user interface 1200 to display the operating state immediately preceding the operating state currently being displayed. In response to selecting the previous state button, adaptive user interface 1200 can move the highlighting in state transition diagram 1202 to the previous operating state and previous state transition.

Similarly, the user can select the next state button to cause adaptive user interface 1200 to display the operating state immediately following the operating state currently being displayed. In response to selecting the next state button, adaptive user interface 1200 can move the highlighting in state transition diagram 1202 to the next operating state and next state transition. The user can select the current state button to cause adaptive user interface 1200 to display the current operating state, regardless of the operating state being displayed. In response to selecting the current state button, adaptive user interface 1200 can move the highlighting in state transition diagram 1202 to the current operating state and the most recent state transition.

In some embodiments, state history controls 1210 include a "Rewind to State" search box into which a user can enter a particular operating state (e.g., by state name, by state identifier, etc.). Adaptive user interface generator 1114 can identify the user-specified operating state and can search the state history for the most recent time the operating state occurred. Upon finding the most recent occurrence of the user-specified operating state, adaptive user interface 1200 can move the highlighting in state transition diagram 1202 to the user-specified operating state and the state transition leading into the most recent occurrence of the user-specified operating state. Adaptive user interface 1200 can update the time 1204 in state and transition occurrence time 1208 each time the highlighted operating state changes to reflect the values associated with the highlighted operating state.

In some embodiments, state history controls 1210 include a "Rewind to Time" search box into which a user can enter a particular time and/or date. Adaptive user interface generator 1114 can identify the user-specified time and can search the state history for the operating state in which the system was operating at the identified time. Upon finding the operating state corresponding to the user-specified time, adaptive user interface 1200 can move the highlighting in state transition diagram 1202 to the identified operating state and the state transition leading into the occurrence of the identified operating state.

In some embodiments, state history controls 1210 include a play button. A user can select the play button to cause adaptive user interface 1200 to progress through the sequence of operating states and state transitions specified by the state history until the current operating state is reached. Adaptive user interface 1200 may sequentially highlight each operating state and state transition in the state history for a predetermined amount of time (e.g., 5 seconds, 15 seconds, etc.) before advancing to the next operating state and state transition in the sequence. In some embodiments, state history controls 1210 include a pause button to allow the user to pause the state history playback. With each advance to the next operating state in the sequence, adaptive user interface 1200 can move the highlighting in state transition diagram 1202 to the next operating state and state transition in the state history.

In some embodiments, adaptive user interface 1200 includes a selectable button 1206 to view state statistics. Selecting button 1206 may cause adaptive user interface 1200 to display detailed statistics for the various operating states and state transitions. For example, adaptive user interface 1200 can display the cumulative amount of time spent in each operating state within a predetermined time window, the total number of times each state transition occurred, the most frequent operating states or state transitions, fault occurrences in each operating state, and/or any other statistics associated with the operating states. The state statistics can be derived from information gathered by state history tracker 1112, fault detector 1116, state controllers 1120, or other components of hybrid controller 1102.

In some embodiments, adaptive user interface 1200 includes the state description 1212 and the transition description 1214 provided by adaptive state information generator 1124. Both the state description 1212 and the transition description 1214 can be updated dynamically in response to user input received via adaptive user interface 1200. For example, a user can click on a particular operating state in state transition diagram 1202 to display the state description 1212 associated with that operating state. Similarly, the user can click on a particular state transition in state transition diagram 1202 to display the transition description 1214 associated with that state transition.

The state description 1212 and transition description 1214 can be dynamically updated to provide descriptions of the operating state and state transition highlighted in state transition diagram 1202. For example, the state description 1212 and transition description 1214 can be replaced with the corresponding descriptions for whichever operating state and/or state transition is highlighted in state transition diagram 1202. As described above, both the state description 1212 and transition description 1214 can be customized to the particular user or user class to which adaptive user interface 1200 is presented.

In some embodiments, adaptive user interface 1200 indicates the operational status 1216 for the highlighted operating state. Operational status 1216 can include the expected values of various data points associated with the operating state, as defined by the expected operational status received from expected status database 1126. Operational status 1216 can include a data table, chart, graph, or other representation of the expected values for the operating state. Operational status 1216 can also include the actual values of each data point for which an expected value is provided. The actual values can be received as measurements from sensors 614, input from supervisory controller 616 or user devices 618, operating data from BMS equipment 628, generated by hybrid controller 1102, or received from any other data source. Advantageously, operational status 1216 can convey both the expected values and the actual values of the data points to allow a user to readily determine whether the system is operating as expected.

The data table shown in FIG. 12 is one example of an operational status 1216 which can be included in adaptive user interface 1200. The data table includes an indication of various point names associated with the highlighted operating state, expected values of the data points, actual values of the data points, and actions to be performed when the actual values differ from the expected values. The actions can be presented in the form of instructions for a user. In some embodiments, the instructions are tailored to the user or user class to which adaptive user interface 1200.

In some embodiments, a portion of the data table can be highlighted or otherwise emphasized to distinctly indicate differences between expected and actual values. For example, the bottom row of the data table shows a difference between the expected value of "0 gpm" for the cooling thermal energy storage (TES) flow rate and the actual value of "2000 gpm" for the cooling TES flow rate. Adaptive user interface 1200 can modify the bottom row by changing the color of the text (e.g., displaying the bottom row in red text), changing a background color of the bottom row, flashing the text of the bottom row, or otherwise presenting the text of the bottom row in a manner that draws attention to the difference between the expected and actual value.

In some embodiments, operational status 1216 includes a fault indication 1218. Fault indication 1218 can identify one or more faults detected in the highlighted operating state or any other operating state. Fault indication 1218 can provide information about the detected faults. For example, fault indication 1218 is shown displaying the text "Cooling TES Flow Rate Out of Range." In some embodiments, fault indication 1218 indicates a time at which each fault occurred, a time elapsed since the fault occurred, an expected monetary value associated with the fault, or other fault details. In some embodiments, operational status 1216 includes a fault details button 1220 which can be selected to display detailed information and statistics relating to the detected faults.

Adaptive user interface 1200 can take advantage of information already contained in hybrid control implementations to initiate the display of text fields that concisely explain various types of information to identified user classes. For example, adaptive user interface 1200 can explain what the system is currently trying to do by presenting state information in the form of state transition diagram 1202 and state description 1212. Adaptive user interface 1200 can explain why the system operating in the current operating state by presenting state transition information in the form of state transition diagram 1202 and transition description 1214. Adaptive user interface 1200 can explain how long the system has been operating in the current state by presenting time 1204. Adaptive user interface 1200 can explain how the system typically behaves by allowing a user to rewind and playback the history of operating states and state transitions via state history controls 1210. Adaptive user interface 1200 can explain what should be happening in the current operating state by presenting an expected values for data points via operational status 1216. Adaptive user interface 1200 can explain any detected faults by presenting actual values for the data points in contrast with the expected values. Adaptive user interface 1200 can also detect faults and provide fault indications 1218.

The graphical view of state transition diagram 1202 with highlighted states and state transitions provides a system level view of the control. Adaptive user interface 1200 can continuously adapt the information and content presented to a user based on teal-time operating conditions and data received from other devices of system 1100 (e.g., sensors 614, supervisory controller 616, BMS equipment 628, etc.). This approach can be used with a variety of different controllers (e.g., Metasys controllers) and hybrid controller designs implemented using model based design methods and tools (e.g., Mathworks).

In some embodiments, adaptive user interface 1200 provides both training and operational benefits. For example, hybrid controller 1102 can be connected to a simulated plant before the actual physical plant (e.g., BMS equipment 628 and sensors 614) is brought online. Hybrid controller 1102 can interact with the simulated plant and can generate adaptive user interface 1200 to convey information to a user during an offline training session. Adaptive user interface 1200 can be used to gain an understanding of how the system operates and behaves before the physical plant is brought online. After the physical plant is installed and operating, adaptive user interface 1200 can be used to facilitate operations, troubleshoot faults, and monitor and/or control the physical plant in the same manner as the simulated plant. By allowing the user to gain an understanding of system operation in an offline training mode, adaptive user interface 1200 can prevent the persistent problem of users disabling automatic control features due to lack of understanding.

Flow Diagrams

Figures 13, 14:
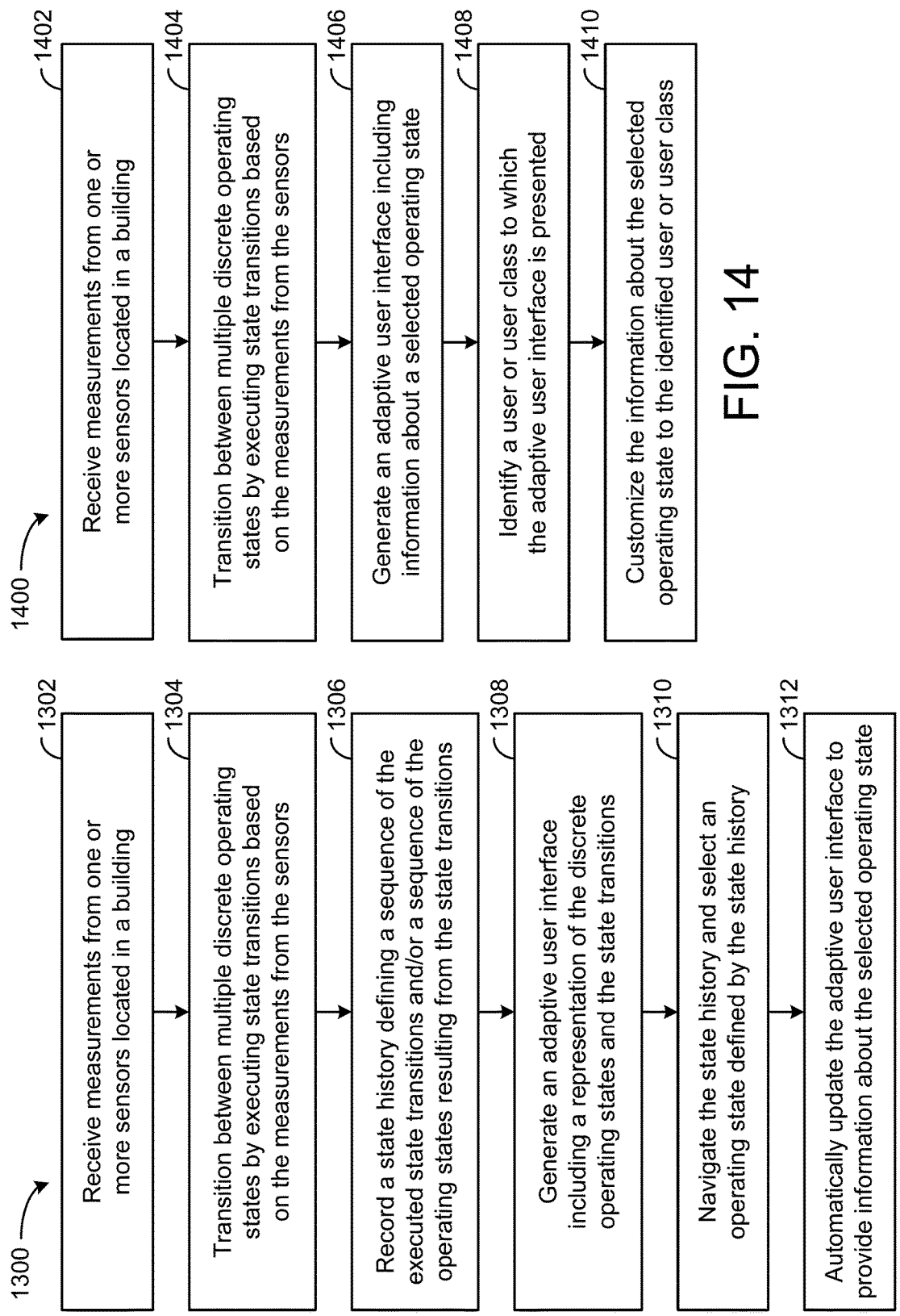
FIG. 13 is a flowchart of a process for operating a hybrid control system and generating an adaptive user interface with state history controls, according to some embodiments.
FIG. 14 is a flowchart of another process for operating a hybrid control system and generating an adaptive user interface based on the identity of the user or user class to which the adaptive user interface is presented, according to some embodiments.

Referring now to FIG. 13, a flow diagram of a process 1300 for generating and providing an adaptive user interface in a hybrid control system is shown, according to an exemplary embodiment. Process 1300 can be performed by one or more components of building control system 1100, as described with reference to FIG. 11. In some embodiments, process 1300 is performed by hybrid controller 1102.

Process 1300 is shown to include receiving measurements from one or more sensors located in a building (step 1302). The sensors can include can include any of a variety of sensors (e.g., temperature sensors, humidity sensors, flow rate sensors, pressure sensors, voltage sensors, electric current sensors, light sensors, etc.) configured to measure one or more monitored variables in the building. The sensors can provide measurements as inputs to the hybrid controller via a communications interface. In some embodiments, the sensors provide a feedback signal to the hybrid controller indicating the value of a variable of interest in the building (e.g., building zone temperature, building zone humidity, system power consumption, etc.). The hybrid controller can use the measurements from sensors to evaluate state transition conditions and/or to perform closed loop control operations within various operating states.

Process 1300 is shown to include transitioning between multiple discrete operating states by executing state transitions based on the measurements from the sensors (step 1304). In some embodiments, step 1304 is performed by state transition controller 1110. Step 1304 can include operating as a finite state machine to evaluate state transition conditions and transition between various operating states. The state transition conditions and the logic used in step 1304 can be stored in a database for later retrieval.

In some embodiments, step 1304 includes providing an indication of the current operating state to one or more state controllers. Each state controller can operate as a closed loop controller within a particular operating state. For example, each state controller can generate and provide a control signal to building equipment (e.g., BMS equipment 628) while operating within an operating state. In some embodiments, each state controller becomes active when a state transition occurs into the corresponding operating state and inactive when a state transition occurs out of the corresponding operating state. In some embodiments, each of the state controllers uses a different control algorithm and/or different control logic. This allows the hybrid controller to function as multiple different controllers, each of which controls system operation in a particular operating state.

Process 1300 is shown to include recording a state history defining a sequence of the executed state transitions and/or a sequence of the operating states resulting from the state transitions (step 1306). In some embodiments, step 1306 is performed by state history tracker 1112. Step 1306 can include recording a time at which each state transition occurs along with an identity of the origin state (i.e., the current operating state immediately prior to the state transition) and the destination state (i.e., the current operating state immediately following the state transition). In some embodiments, step 1306 includes generating statistics relating to the state transitions and/or the operating states. For example, step 1306 can include determining an amount of time spent in a given operating state by subtracting the time at which a state transition occurs into the operating state from the time at which a state transition occurs out of the operating state.

In some embodiments, step 1306 includes recording the state transition condition or conditions which trigger each state transition. For example, step 1306 can include identifying the particular transition condition which was satisfied to trigger the state transition and storing an indication of the satisfied state transition condition along with the time at which the state transition occurred. Step 1306 can include determining the most common transitions into each operating state and out of each operating state by analyzing a history of state transitions over time. Step 1306 can include identifying the most common state transition conditions or triggers for each state transition.

In some embodiments, the state history recorded in step 1306 includes a time series of state values which can be used to reconstruct the sequence of operating states over a period of time. Each element of the time series (e.g., each operating state) can include a plurality of attributes characterizing the element. For example, each operating state in the time series can include attributes defining the identity of the operating state (i.e., the state value), the time at which a transition occurs into the operating state, the state transition condition which was satisfied to trigger the transition into the operating state, the origin state from which the state transition occurs, the time at which a transition occurs out of the operating state, the state transition condition which was satisfied to trigger the transition out of the operating state, the destination state into which the transition occurs from the operating state, a time spent in the operating state, and/or other attributes characterizing the operating state in the time series.

In some embodiments, the state history includes a time series of state transitions which can be used to reconstruct the sequence of operating states over a period of time. Each element of the time series (e.g., each state transition) can include a plurality of attributes characterizing the element. For example, each state transition in the time series can include attributes defining the identity of the state transition (e.g., by an alphanumeric identifier), the time at which the state transition occurs, the origin state immediately preceding the state transition, the destination state immediately following the state transition, the particular transition condition which triggered the state transition, the time spent in the previous operating state, the previous state transition, and/or other attributes characterizing the state transition in the time series.

Still referring to FIG. 13, process 1300 is shown to include generating an adaptive user interface including a representation of the discrete operating states and the state transitions (step 1308). In some embodiments, step 1308 is performed by adaptive user interface generator 1114. The adaptive user interface can be the same or similar to adaptive user interface 1200, as described with reference to FIG. 12. In some embodiments, step 1308 includes generating the adaptive user interface using the state history from step 1306, the state information and transition information from step 1304, and/or detected faults from fault detector 1116. In some embodiments, the adaptive user interface is presented via a user interface device of the hybrid controller (e.g., an electronic display, speakers, etc.). In other embodiments, the adaptive user interface can be sent to a user device and presented to a user via a user interface element of the user device.

In some embodiments, the adaptive user interface includes a the state transition diagram of the controlled system (e.g., state transition diagram 700 or 1000) or an abstraction of the state transition diagram. The current operating state can be highlighted in the state transition diagram along with the transition condition that caused the transition into the current operating state. Step 1308 can include updating the state transition diagram in real-time (e.g., in response to a state transition) to reflect changes to the current operating state. For example, step 1308 can include automatically moving the highlighting from the previous operating state to the current operating state and from the previous state transition to the most recent state transition in response to a state transition occurring. In some embodiments, the adaptive user interface indicates a time at which the highlighted state transition occurred and/or an amount of time the system has been operating in the highlighted operating state.

In some embodiments, the adaptive user interface includes the state information and the transition information provided by adaptive state information generator 1124. Both the state information and the transition information can be updated dynamically in response to user input received via the adaptive user interface. For example, a user can click on a particular operating state in the adaptive user interface to display the state information associated with that operating state. Similarly, the user can click on a particular state transition in the adaptive user interface to display the transition information associated with that state transition. As described above, both the state information and transition information can be customized to the particular user or user class to which the adaptive user interface is presented.

In some embodiments, the adaptive user interface includes a user interface element containing the expected values defined by the expected operational status for a particular operating state (e.g., the current operating state, a user-selected operating state, etc.). The user interface element can include, for example, a data table, chart, graph, or other representation of the expected values for the operating state. The user interface element can also include the actual values of each data point for which an expected value is provided. Advantageously, the user interface element can convey both the expected values and the actual values of the data points to allow a user to readily determine whether the system is operating as expected.

Still referring to FIG. 13, process 1300 is shown to include navigating the state history and selecting an operating state defined by the state history (step 1310) and automatically updating the adaptive user interface to provide information about the selected operating state. Step 1310 can include navigating the state history using user-operable state history controls of the adaptive user interface. The state history controls can allow a user to view the state history provided by step 1306. The user can operate the state history controls to view each state and state transition in the state history, along with the state description, transition description, and operational status associated therewith. For example, the state history controls can include a current state button, a previous state button, a play button, and a next state button. The user can select the previous state button to cause the adaptive user interface to display the operating state immediately preceding the operating state currently being displayed. In response to selecting the previous state button, the adaptive user interface can move the highlighting in the state transition diagram to the previous operating state and previous state transition.

Similarly, the user can select the next state button to cause the adaptive user interface to display the operating state immediately following the operating state currently being displayed. In response to selecting the next state button, the adaptive user interface can move the highlighting in the state transition diagram to the next operating state and next state transition. The user can select the current state button to cause the adaptive user interface to display the current operating state, regardless of the operating state being displayed. In response to selecting the current state button, the adaptive user interface can move the highlighting in the state transition diagram to the current operating state and the most recent state transition.

In some embodiments, the state history controls include a "Rewind to State" search box into which a user can enter a particular operating state (e.g., by state name, by state identifier, etc.). Step 1310 can include identifying the user-specified operating state and can search the state history for the most recent time the operating state occurred. Upon finding the most recent occurrence of the user-specified operating state, step 1312 can include moving the highlighting in the state transition diagram to the user-specified operating state and the state transition leading into the most recent occurrence of the user-specified operating state. Step 1312 can include updating the time in state and transition occurrence time each time the highlighted operating state changes to reflect the values associated with the highlighted operating state.

In some embodiments, the state history controls include a "Rewind to Time" search box into which a user can enter a particular time and/or date. Step 1310 can include identifying the user-specified time and can search the state history for the operating state in which the system was operating at the identified time. Upon finding the operating state corresponding to the user-specified time, step 1312 can include moving the highlighting in the state transition diagram to the identified operating state and the state transition leading into the occurrence of the identified operating state.

In some embodiments, the state history controls include a play button. A user can select the play button to cause the adaptive user interface to progress through the sequence of operating states and state transitions specified by the state history until the current operating state is reached. Step 1312 can include sequentially highlighting each operating state and state transition in the state history for a predetermined amount of time (e.g., 5 seconds, 15 seconds, etc.) before advancing to the next operating state and state transition in the sequence. In some embodiments, the state history controls include a pause button to allow the user to pause the state history playback. With each advance to the next operating state in the sequence, step 1312 can move the highlighting in the state transition diagram to the next operating state and state transition in the state history Referring now to FIG. 14, a flow diagram of another process 1400 for generating and providing an adaptive user interface in a hybrid control system is shown, according to an exemplary embodiment. Process 1400 can be performed by one or more components of building control system 1100, as described with reference to FIG. 11. In some embodiments, process 1400 is performed by hybrid controller 1102.

Process 1400 is shown to include receiving measurements from one or more sensors located in a building (step 1402). The sensors can include can include any of a variety of sensors (e.g., temperature sensors, humidity sensors, flow rate sensors, pressure sensors, voltage sensors, electric current sensors, light sensors, etc.) configured to measure one or more monitored variables in the building. The sensors can provide measurements as inputs to the hybrid controller via a communications interface. In some embodiments, the sensors provide a feedback signal to the hybrid controller indicating the value of a variable of interest in the building (e.g., building zone temperature, building zone humidity, system power consumption, etc.). The hybrid controller can use the measurements from sensors to evaluate state transition conditions and/or to perform closed loop control operations within various operating states.

Process 1400 is shown to include transitioning between multiple discrete operating states by executing state transitions based on the measurements from the sensors (step 1404). In some embodiments, step 1404 is performed by state transition controller 1110. Step 1404 can include operating as a finite state machine to evaluate state transition conditions and transition between various operating states. The state transition conditions and the logic used in step 1404 can be stored in a database for later retrieval.

In some embodiments, step 1404 includes providing an indication of the current operating state to one or more state controllers. Each state controller can operate as a closed loop controller within a particular operating state. For example, each state controller can generate and provide a control signal to building equipment (e.g., BMS equipment 628) while operating within an operating state. In some embodiments, each state controller becomes active when a state transition occurs into the corresponding operating state and inactive when a state transition occurs out of the corresponding operating state. In some embodiments, each of the state controllers uses a different control algorithm and/or different control logic. This allows the hybrid controller to function as multiple different controllers, each of which controls system operation in a particular operating state.

Still referring to FIG. 14, process 1400 is shown to include generating an adaptive user interface including information about a selected operating state (step 1406). In some embodiments, step 1406 is performed by adaptive user interface generator 1114. The adaptive user interface can be the same or similar to adaptive user interface 1200, as described with reference to FIG. 12. In some embodiments, step 1406 includes generating the adaptive user interface using the state history from step 1306, the state information and transition information from step 1304, and/or detected faults from fault detector 1116. In some embodiments, the adaptive user interface is presented via a user interface device of the hybrid controller (e.g., an electronic display, speakers, etc.). In other embodiments, the adaptive user interface can be sent to a user device and presented to a user via a user interface element of the user device.

In some embodiments, the adaptive user interface includes a the state transition diagram of the controlled system (e.g., state transition diagram 700 or 1000) or an abstraction of the state transition diagram. The current operating state can be highlighted in the state transition diagram along with the transition condition that caused the transition into the current operating state. Step 1406 can include updating the state transition diagram in real-time (e.g., in response to a state transition) to reflect changes to the current operating state. For example, step 1406 can include automatically moving the highlighting from the previous operating state to the current operating state and from the previous state transition to the most recent state transition in response to a state transition occurring. In some embodiments, the adaptive user interface indicates a time at which the highlighted state transition occurred and/or an amount of time the system has been operating in the highlighted operating state.

In some embodiments, the adaptive user interface includes the state information and the transition information provided by adaptive state information generator 1124. Both the state information and the transition information can be updated dynamically in response to user input received via the adaptive user interface. For example, a user can click on a particular operating state in the adaptive user interface to display the state information associated with that operating state. Similarly, the user can click on a particular state transition in the adaptive user interface to display the transition information associated with that state transition. As described above, both the state information and transition information can be customized to the particular user or user class to which the adaptive user interface is presented.

In some embodiments, the adaptive user interface includes a user interface element containing the expected values defined by the expected operational status for a particular operating state (e.g., the current operating state, a user-selected operating state, etc.). The user interface element can include, for example, a data table, chart, graph, or other representation of the expected values for the operating state. The user interface element can also include the actual values of each data point for which an expected value is provided. Advantageously, the user interface element can convey both the expected values and the actual values of the data points to allow a user to readily determine whether the system is operating as expected.

Still referring to FIG. 14, process 1400 is shown to include identifying a user or user class to which the adaptive user interface is presented (step 1408). In some embodiments, step 1408 is performed by user identifier 1122. Step 1408 can include identifying a particular user or user class interacting with the hybrid controller via the adaptive user interface. In some embodiments, step 1408 includes identifying the user based on login credentials provided by the user (e.g., a user name, a user ID, etc.). In some embodiments, step 1408 includes identifying the user by examining biometric markers provided by the user. For example, step 1408 can include using a camera (e.g., a device of BMS equipment 628) to capture an image of the user and identifying the user based on the image. Step 1408 can include using a fingerprint, a voice print, or other biometric marker to uniquely identify the user from a set of users for which biometric markers have been stored.

Step 1408 can include determining a user class or group associated with the identified user. In some embodiments, step 1408 includes accessing a user database which indicates one or more user groups or classes to which the identified user belongs. For example, step 1408 can identify the user as a member of the "operations staff" class or the "service technicians" class based on information from the user database. In some embodiments, step 1408 includes identifying various attributes of the user or user class. For example, step 1408 can identify the user's preferred learning style (e.g., visual, auditory, tactile, etc.) by accessing a user profile associated with the user. In some embodiments, step 1408 includes identifying a level of technical understanding or experience associated with the user or user class (e.g., inexperienced, veteran, expert, etc.).

In some embodiments, step 1408 includes identifying attributes of the user by retrieving information from a database. Step 1408 can include learning the behavior and/or preferences of the user over time (e.g., based on user feedback or input) and can update the database to reflect the learned attributes of the user. For example, step 1408 can include presenting the user with a prompt to specify user attributes and preferences such as the user's preferred learning style, the user's technical experience, the level of detail the user wants to see, etc. Step 1408 can include using feedback from the user to populate one or more attributes of a user profile stored in the database.

In some embodiments, step 1408 includes automatically learning the user's behavior and preferences without requiring the user to specify such information. For example, step 1408 can include analyzing actions that have been taken by the user (e.g., manual override decisions) or input provided by the user (e.g., requests for a different type of information) in response to various sets of information presented via the adaptive user interface. Step 1408 can include using the feedback from the user to automatically determine the user's preferences and level of technical understanding or expertise. For example, if the user repeatedly overrides automatic control decisions with suboptimal manual settings when presented with a set of information tailored to expert users, step 1408 can determine that the user does not understand the expert information and should be presented with a set of information tailored to less experienced users. Similarly, if the user repeatedly requests more details or more complex information when presented with a set of information tailored to novice users, step 1408 can determine that the user should be presented with a set information tailored to more experienced users. Step 1408 can include using the learned behaviors and/or preferences of the user to automatically update the attributes of the user profile stored in the database.

Still referring to FIG. 14, process 1400 is shown to include customizing the information about the selected operating state to the identified user or user class (step 1410). In some embodiments, step 1410 includes receiving state and transition descriptions from descriptive text database 1128. Descriptive text database 1128 can include multiple different descriptions (e.g., snippets of descriptive text) for each operating state and for each state transition. Each description can be tailored to communicate effectively with a different type of user or user class (e.g., building owners, novice users, operations staff, service technicians, expert users, etc.) based on the attributes and abilities of the user or user class. For example, descriptive text database 1128 can include a general description of each operating state and state transition for novice users, and a more detailed technical description of each operating state and state transition for expert users.

Step 1410 can include customizing the state information and the transition information presented in the adaptive user interface to the particular user or user class to which the information will be presented. In some embodiments, step 1410 include selecting a particular set of state descriptions and transition descriptions from descriptive text database 1128 based on the identity of the user or user class to which the descriptions will be presented.

In some embodiments, step 1410 includes receiving an expected operational status (i.e., expected status information) for one or more of the operating states from expected status database 1126. An expected operational status can include expected values for various data points associated with the operating state. Such data points can include, for example, monitored variables, calculated variables, system parameters, feedback loop status indicators, equipment status indicators, or other data points associated with the operating state. The expected operational status can be presented to a user via the adaptive user interface. In some embodiments, the expected operational status includes a set of instructions for a user (e.g., actions to perform) when the expected values differ from the actual values of the corresponding data point. Like the state and transition descriptions, the set of instructions can be tailored to the particular user or user class to which the expected operational status will be presented.

Step 1410 can include customizing the expected operational status presented in the adaptive user interface to the particular user or user class to which the expected operational status will be presented. Expected status database 1126 can include multiple sets of expected status information for each operating state. Each set of expected status information can be tailored to communicate effectively with a different type of user or user class (e.g., building owners, novice users, operations staff, service technicians, expert users, etc.) based on the attributes and abilities of the user or user class. For example, expected status database 1126 can include a less detailed expected operational status for each operating state for novice users, and a more detailed expected operational status for each operating state for expert users. Step 1410 can include selecting and retrieving a particular expected operational status from expected status database 1126 based on the identity of the user or user class to which the expected operational status will be presented.

In some embodiments, step 1410 includes identifying a preferred learning style for the identified user or user class. Step 1410 can include adapting the information about the selected operating state to the preferred learning style for the identified user or user class. For example, step 1410 can include determining whether the preferred learning style is an auditory learning style. In response to a determination that the preferred learning style is the auditory learning style, step 1410 can include using a voice command module to present the information about the selected operating state in an auditory format.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A building control system comprising:
   a controller comprising a processing circuit configured to:
   transition between multiple discrete operating states by executing state transitions;
   generate an adaptive user interface comprising a representation of the multiple discrete operating states and the state transitions therebetween;
   automatically learn, based on a history of actions taken or input provided by a user via the adaptive user interface, one or more learned behaviors or preferences of the user with respect to information presented via the adaptive user interface;
   retrieve, from a descriptive text database, a natural language description of a selected operating state or selected state transition based on the one or more learned behaviors or preferences of the user, the descriptive text database storing multiple different natural language descriptions of the selected operating state or selected state transition, the multiple different natural language descriptions comprising (1) a first natural language description that describes the selected operating state or selected state transition using one or more first paragraphs or sentences and (2) a second natural language description that describes the selected operating state or selected state transition using one or more second paragraphs or sentences different from the one or more first paragraphs or sentences; and update the adaptive user interface to provide the natural language description of the selected operating state or selected state transition retrieved from the descriptive text database based on the one or more learned behaviors or preferences of the user.

2. The system of claim 1, wherein the actions taken or input provided by the user via the adaptive user interface are in response to being presented with a first natural language description of the selected operating state or selected state transition via the adaptive user interface; and wherein the one or more learned behaviors or preferences indicate that the user would prefer a second natural language description of the selected operating state or selected state transition, different from the first natural language description of the selected operating state or selected state transition.

3. The system of claim 1, wherein the processing circuit is configured to identify a preferred learning style of the user and adapt the information presented via the adaptive user interface to the preferred learning style of the user.

4. The system of claim 1, wherein the natural language description of the selected operating state comprises an explanation of control operations performed in the selected operating state.

5. The system of claim 1, wherein the natural language description of the selected state transition comprises an explanation of one or more state transition conditions that were satisfied to trigger the selected state transition.

6. The system of claim 1, wherein the processing circuit is configured to record a state history comprising at least one of a sequence of state transitions executed and a sequence of operating states resulting from the state transitions.

7. The system of claim 1, wherein the multiple different natural language descriptions of the selected operating state or the selected state transition correspond to different levels of technical understanding or expertise.

8. The system of claim 1, wherein the processing circuit is configured to generate a set of information for presentation to the user via the adaptive user interface, wherein the information presented to the user comprises information corresponding to a current operating state, a past operating state, or a future operating state.

9. The system of claim 1, wherein the processing circuit is configured to update a user profile for the user based on the learned behavior and preferences of the user and generate at least a portion of the adaptive user interface based on the user profile.

10. The system of claim 1, wherein the processing circuit is configured to identify a user class or group associated with the user and generate at least a portion of the adaptive user interface based on the user class or group associated with the user.

11. The system of claim 1, further comprising a user device configured to:

present, to the user, the adaptive user interface comprising the representation of the multiple discrete operating states and the state transitions therebetween;

receive one or more inputs from the user that indicate the actions taken or input provided by the user via the adaptive user interface, wherein the inputs provided to the user device by the user are communicated from the user device to the controller; and present, to the user, an updated version of the adaptive user interface, wherein the updated version of the adaptive user interface comprises the natural language description of the selected operating state or selected state transition retrieved from the descriptive text database based on the one or more inputs from the user.

12. A method for controlling a building system, the method comprising:

transitioning between multiple discrete operating states by executing state transitions;

generating an adaptive user interface comprising a representation of the multiple discrete operating states and the state transitions therebetween;

automatically learning, based on a history of actions taken or input provided by a user via the adaptive user interface, one or more learned behaviors or preferences of the user with respect to information presented via the adaptive user interface;

retrieving, from a descriptive text database, a natural language description of a selected operating state or selected state transition based on the one or more learned behaviors or preferences of the user, the descriptive text database storing multiple different natural language descriptions of the selected operating state or selected state transition, the multiple different natural language descriptions comprising (1) a first natural language description that describes the selected operating state or selected state transition using one or more first paragraphs or sentences and (2) a second natural language description that describes the selected operating state or selected state transition using one or more second paragraphs or sentences different from the one or more first paragraphs or sentences; and updating the adaptive user interface to provide the natural language description of the selected operating state or selected state transition retrieved from the descriptive text database based on the one or more learned behaviors or preferences of the user.

13. The method of claim 12, further comprising storing, in a user database, the one or more learned behaviors or preferences of the user based on the history of actions taken or input provided via the adaptive user interface.

14. The method of claim 12, wherein the descriptive text database stores multiple different natural language descriptions of the selected operating state or selected state transition, the multiple different natural language descriptions corresponding to different users or user classes.

15. The method of claim 14, wherein the multiple different natural language descriptions of the selected operating state or selected state transition correspond to different levels of technical understanding or expertise.

16. The method of claim 12, wherein the natural language description of the selected operating state comprises an explanation of control operations performed in the selected operating state.

17. The method of claim 12, wherein the natural language description of the selected state transition comprises an explanation of one or more state transition conditions that were satisfied to trigger the selected state transition.

18. The method of claim 12, further comprising:
presenting the adaptive user interface to the user via a user device;
receiving one or more inputs from the user via the user device;
communicating the one or more inputs from the user device to a controller; and
presenting, to the user, an updated version of the adaptive user interface, wherein the updated version of the adaptive user interface comprises the natural language description of the selected operating state or selected state transition based on the one or more inputs from the user.

19. A building control system comprising:
a controller comprising a processing circuit configured to:
generate an adaptive user interface comprising a representation of one or more states of the building control system;
automatically learn, based on a history of actions taken or input provided by a user via the adaptive user interface, one or more learned behaviors or preferences of the user with respect to information presented via the adaptive user interface;
retrieve, from a descriptive text database, a natural language description of a selected state of the building control system based on the one or more learned behaviors or preferences of the user, the descriptive text database storing multiple different natural language descriptions of the selected state, the multiple different natural language descriptions comprising (1) a first natural language description that describes the selected operating state or selected state transition using one or more first paragraphs or sentences and (2) a second natural language description that describes the selected operating state or selected state transition using one or more second paragraphs or sentences different from the one or more first paragraphs or sentences; and
update the adaptive user interface to provide the natural language description of the selected state retrieved from the descriptive text database based on the one or more learned behaviors or preferences of the user.

20. The system of claim 19, further comprising a user device configured to:
present, to the user, the adaptive user interface comprising the representation of the one or more states of the building control system;
receive one or more inputs from the user, wherein the inputs provided to the user device by the user are communicated from the user device to the controller; and
present, to the user, an updated version of the adaptive user interface, wherein the updated version of the adaptive user interface comprises the natural language description of the selected state based on the one or more inputs from the user.

* * * * *